(12) United States Patent
Griffin

(10) Patent No.: US 11,181,904 B2
(45) Date of Patent: Nov. 23, 2021

(54) REMOTE CONTROL DEVICE AND SYSTEM

(71) Applicant: Michael Amor Griffin, Sydney (AU)

(72) Inventor: Michael Amor Griffin, Sydney (AU)

( * ) Notice: Subject to any disclaimer, the term of this patent is extended or adjusted under 35 U.S.C. 154(b) by 172 days.

(21) Appl. No.: 16/464,179

(22) PCT Filed: Nov. 28, 2017

(86) PCT No.: PCT/AU2017/051311
§ 371 (c)(1),
(2) Date: May 24, 2019

(87) PCT Pub. No.: WO2018/094477
PCT Pub. Date: May 31, 2018

(65) Prior Publication Data
US 2020/0019157 A1 Jan. 16, 2020

(30) Foreign Application Priority Data
Nov. 28, 2016 (AU) .................................. 2016904874

(51) Int. Cl.
G05D 1/00 (2006.01)
B64C 39/02 (2006.01)
(Continued)

(52) U.S. Cl.
CPC .......... *G05D 1/0022* (2013.01); *B64C 39/024* (2013.01); *G05D 1/0016* (2013.01);
(Continued)

(58) Field of Classification Search
CPC .. G05D 1/0022; G05D 1/0016; B64C 39/024; B64C 2201/027; B64C 2201/146;
(Continued)

(56) References Cited

U.S. PATENT DOCUMENTS

| 8,874,283 B1 | 10/2014 | Cavote |
| 2002/0008759 A1* | 1/2002 | Hoyos .................. G05D 1/0038 |
| | | 348/211.99 |

(Continued)

FOREIGN PATENT DOCUMENTS

| GB | 2387218 A | 10/2003 |
| JP | 2008513296 A | 5/2008 |

(Continued)

OTHER PUBLICATIONS

European Search Report and Opinion for EP Application No. 17874545 dated Jun. 24, 2020; 13 pages.

(Continued)

*Primary Examiner* — Muhammad Shafi
(74) *Attorney, Agent, or Firm* — Schwabe Williamson & Wyatt, PC

(57) ABSTRACT

A remote control device for a remotely controlled device including; a first input controller, including a grippable body which a user is able to apply a force and torque thereto with a first hand in order to be able to control yaw, pitch, roll and elevation of a remotely controlled vehicle; a second input controller enabling a user to control, with a second hand, a peripheral device associated with remotely controlled device; a communication device; and a controller, configured to: receive one or more first input and one or more second input signals from the first input controller and the second input controller respectively; and control the communication device for transmitting: a first output signal indicative of a first command based on the force and torque applied to the grippable body; and a second output signal indicative of a second command for controlling the peripheral device.

22 Claims, 18 Drawing Sheets

(51) Int. Cl.
*G05G 1/01* (2008.04)
*G05G 9/047* (2006.01)
*H04L 29/08* (2006.01)

(52) U.S. Cl.
CPC ............ *G05G 1/01* (2013.01); *G05G 9/04737* (2013.01); *H04L 67/125* (2013.01); *B64C 2201/027* (2013.01); *B64C 2201/146* (2013.01); *G05G 2009/04759* (2013.01)

(58) Field of Classification Search
CPC ............... G05G 1/01; G05G 9/04737; G05G 2009/04759; G05G 2009/04777; H04L 67/125; A63H 30/04; A63H 27/12
USPC .............................................................. 701/2
See application file for complete search history.

(56) References Cited

U.S. PATENT DOCUMENTS

| | | | | |
|---|---|---|---|---|
| 2005/0277470 | A1* | 12/2005 | Watanachote | A63F 13/24 463/37 |
| 2006/0271251 | A1 | 11/2006 | Hopkins | |
| 2007/0244608 | A1* | 10/2007 | Rath | G05D 1/0038 701/3 |
| 2011/0275274 | A1 | 11/2011 | Dewitt | |
| 2012/0280087 | A1 | 11/2012 | Coffman et al. | |
| 2016/0031559 | A1 | 2/2016 | Zang | |
| 2016/0297545 | A1* | 10/2016 | Yang | G05D 1/0016 |
| 2016/0306350 | A1* | 10/2016 | Shim | B60R 25/25 |
| 2017/0068424 | A1* | 3/2017 | Hong | H04M 1/72415 |
| 2017/0277176 | A1 | 9/2017 | Hutson | |

FOREIGN PATENT DOCUMENTS

| | | |
|---|---|---|
| WO | 2015/179797 A1 | 11/2015 |
| WO | 2016/154936 A1 | 10/2016 |
| WO | 2017/164975 A1 | 9/2017 |
| WO | 2018/094477 A1 | 5/2018 |

OTHER PUBLICATIONS

Patent Cooperation Treaty: International Search Report and Written Opinion for PCT/AU2017/051311 dated Jan. 30, 2018; 10 pages.

* cited by examiner

REMOTE CONTROL DEVICE AND SYSTEM

CROSS-REFERENCE TO RELATED APPLICATIONS

The present application is a national phase entry under 35 U.S.C. § 371 of International Application No. PCT/AU2017/051311, filed 28 Nov. 2017, which designates the United States of America, which claims priority from Australian Provisional Patent Application No. 2016904874 filed on 28 Nov. 2016, the contents of which are all incorporated herein by reference in their entireties.

TECHNICAL FIELD

The present invention relates to a remote control and a system for operating a remotely controlled device.

BACKGROUND

There are a number of remotely controlled devices on the market that can be controlled by a user operating a remote control device.

A number of remote control devices generally include two joystick controls to enable the user to control a remotely controlled device. For example, for unmanned aerial vehicles (UAVs), it is common that the remote control device includes a left joystick that allows the user to control elevation (e.g. up and down) and yaw (e.g. left or right) of the UAV, and a right joystick that allows the user to control pitch (e.g. up and down) and roll (e.g. left or right) of the UAV. It has been found that for at least beginners learning the art of controlling a UAV, the division of controlling the yaw, pitch and roll movements between two different joysticks operated by two different hands is difficult and is not intuitive.

Furthermore, as known remote control devices generally require the user to operate the remote control device using both hands, it may be difficult for the user to also simultaneously operate a peripheral device. For example, in relation to UAVs, such a peripheral device may be a camera which is mounted to the UAV. The user is required to simultaneously control the UAV using the left and right joysticks and a further remote control device for the peripheral device. This is not ideal and may be extremely difficult to accomplish.

Furthermore, it is common for remote control devices currently allow the user to define a response function in order to customise the output signal generated in response to the user input. For example, in relation to remote control devices for controlling remote controlled vehicles such as a UAV, some users may like to apply a minimal force to the joystick to indicate a certain amount of increase in the throttle, where in contrast other users may like to apply significantly more force to control the throttle the same amount. As such, some remote control devices can be placed into a configuration mode in order to allow the user to customise the response function for the user. Each response function that is set defines the same characteristics in the opposite control direction. For example, if the user were to apply a certain amount of force to the joystick control to increase the throttle a certain amount, the same amount of force needs to be applied to the joystick control in the opposite direction in order for the throttle of the UAV to be decreased by the same amount. This configuration of the response functions assumes that all users apply the same force to the joystick in opposing directions.

Furthermore, user customized response functions are generally based on a Newton polynomial which is an interpolation polynomial for a given set of data points. Remote control devices which are based on the Newton polynomial allow the user to define a plurality of nodes, where each node includes a user defined input and a user defined output. However, one of the disadvantages of defining the user customized response function based on a Newton polynomial and a plurality of user defined nodes is that a significant number of nodes are required to achieve a response curve which the user desires. This can therefore require a significant amount of processing to be performed by the remote control device when attempting to determine the output in response to the input. Furthermore, the nodes must be spaced evenly along the x-axis is a symmetrical fashion. Generally, the user defines these nodes on a small display screen and buttons provided with the remote control device which can be difficult to use. Due to the difficulty of using such an interface provided by the remote control device and additionally due to the high number of nodes that need to be defined, the task faced by the user in defining one or more customized user response functions can be daunting.

Additionally, remote control devices can also be used for multiple remotely controlled devices which means that the remote control device generally has stored in memory a plurality of configuration settings such as multiple sets of nodes. Therefore, if the user wishes to control a different remotely controlled device, the user must operate the remote control device to select the different configuration settings which are to be used with the different UAV. This can mean that the user needs to scroll through various user interfaces to identify the appropriate configuration settings to be used which can be time consuming and frustrating.

Therefore, there is a need to alleviate one or more of the above-mentioned problems or at least provide a useful alternative.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY

In a first aspect there is provided a remote control device for a remotely controlled device, the remote control device including:

a housing;

a first input controller, extending from the housing, including a grippable body which a user is able to apply a force and torque thereto with a first hand in order to be able to control yaw, pitch, roll and elevation of a remotely controlled vehicle, wherein the first input controller generates one or more first input signals indicative of the force and the torque applied to the grippable body;

a second input controller, extending from the housing, enabling a user to control, with a second hand, a peripheral device associated with remotely controlled device, wherein the second input controller generates one or more second input signals;

a communication device; and a controller, located within the housing and electrically connected to the first input controller, the second input controller and the communication device, wherein the controller is configured to:

receive the one or more first input signals and the one or more second input signals from the first input controller and the second input controller respectively; and control the communication device for transmitting:
 a first output signal indicative of a first command based on the force and torque applied to the grippable body indicated by the one or more first input signals; and
 a second output signal indicative of a second command for controlling the peripheral device indicated by the one or more second input signals.

In certain embodiments, the grippable body has a substantially spherical body having a stem that extends from the housing in a first direction, and wherein the second input controller includes a joystick that extends from the housing in a second direction which is substantially orthogonal to the first direction.

In certain embodiments, an upper portion of the housing has a recessed section locating the grippable body.

In certain embodiments, an upper surface of the grippable body is substantially aligned with a top surface of the housing.

In certain embodiments, the underside surface of the grippable body is substantially aligned with the joystick in a returned position.

In certain embodiments, the first input controller and second input controller are modular components which are releasably couplable to a portion of the housing and electrically couplable to the controller.

In certain embodiments, the remote control device includes a detachable signal generating module for generating the first signal, wherein the controller includes an interface for releasably coupling the signal generating module to the remote control device, wherein the controller is configured to:
 transfer, via the interface and to the signal generating module, the first command; and
 receive, via the interface and from the signal generating module, the first signal for transmission via the communication device.

In certain embodiments, the controller is configured to transfer the first command to the signal generating module via the interface in response to detecting the signal generating module being coupled to the interface.

In certain embodiments, the remote control device includes a second signal generating module for releasably connection to the interface of the controller, wherein the controller is configured to:
 transfer, via the interface and to the second signal generating module, the second command; and
 receive, via the interface and from the signal generating module, the second signal for transmission via the communication device.

In certain embodiments, the controller has stored in memory a plurality of user defined nodes, wherein the plurality of user defined nodes are used in an interpolating function for interpolating an output value based on an input value indicated by the one or more first input signals or the one or more second input signals, wherein the output value is used by the controller to generate at least one of the first and second command, wherein the nodes are not evenly spaced.

In certain embodiments, the interpolating function is a Lagrange polynomial function wherein the memory has stored therein a constant value for each user defined node, wherein each constant value is recalled from memory during interpolation of the output value.

In certain embodiments, the controller receives, via the communication device, the one or more user defined nodes from another device.

In certain embodiments, the controller receives the one or more user defined nodes from one of:
 a transceiver device associated with the peripheral device; and
 a processing system.

In a second aspect there is provided a system including:
 a transceiver device associated with a remotely controlled device, wherein the transceiver includes:
  a transceiver communication device:
  a transceiver interface to communicate with a controller of the remotely controlled device;
  a transceiver controller configured to:
   transfer a request, via the interface to the controller of the remotely controlled device, for an identifier indicative of the remotely controlled device which the transceiver is associated therewith;
   receive a response, via the interface from the controller of the remotely controlled device, indicative of the identifier; and
   transfer a transceiver signal, via the communication device to a remote control device, indicative of the identifier; and
 the remote control device according to the first aspect, wherein a plurality of sets of user defined nodes for a plurality of remotely controlled devices, including the remotely controlled device, are stored in memory of the controller of the remote control device, wherein the controller of the remote control device is configured to select one of the sets of user defined nodes based on the identifier indicative of the remotely controlled device, wherein the selected set of user defined nodes are used in an interpolating function for interpolating an output value based on an input value indicated by the one or more first input signals to generate the one or more first commands.

In a third aspect there is provided a system including:
 a transceiver device associated with a remotely controlled device, wherein the transceiver includes:
  a transceiver communication device:
  a transceiver interface to communicate with a controller of the remotely controlled device;
  a transceiver controller including a memory having stored therein a plurality of sets of user defined nodes for a plurality of remotely controlled device including the remotely controlled device, wherein the transceiver controller is configured to:
   transfer a request, via the interface to the controller of the remotely controlled device, for an identifier indicative of the remotely controlled device which the transceiver is associated therewith;
   receive a response, via the interface from the controller of the remotely controlled device, indicative of the identifier;
   select, based on the identifier, a set of user defined nodes for the remotely controlled device from the plurality of sets of user defined nodes; and
   transfer a transceiver signal, via the communication device to a remote control device, indicative of the selected set of user defined nodes for the remotely controlled device; and
 the remote control device according to the first aspect, wherein the controller is configured to:
  receive, via the communication device, the transceiver signal;

store the selected set of user defined nodes indicated by the transceiver signal in memory; and use the selected set of user defined nodes and an input value indicated by the one or more first input signals in an interpolating function for interpolating an output value used for generating the one or more first commands.

In certain embodiments, the request for the identifier indicative of the remotely controlled device is initiated in response to the transceiver receiving an initialisation signal from the remote control device.

In certain embodiments, the interpolating function is a Lagrange polynomial function, wherein the memory has stored therein a constant value for each user defined node, wherein each constant value is recalled from memory during interpolation of the output value.

In a fourth aspect there is provided a system including:
the remote control device according to the first aspect; and
a processing system in wired or wireless communication with the remote control device, wherein the processing system is configured to:
  receive, via an input device of the processing system, a plurality of nodes for use in an interpolating function for interpolating an output value based on an input value indicated by the one or more first input signals or the one or more second input signals; and
  transfer, to the remote control device, the plurality of user defined nodes.

In certain embodiments, the interpolating function is a Lagrange polynomial function, wherein the processing system is configured to calculate a constant value for each user defined node, wherein each constant value is transferred together with the plurality of user defined nodes to the remote control device, wherein each constant value is used during interpolation of the output value.

In certain embodiments, the processing system is a mobile communication device executing a mobile communication device application.

In a fifth aspect there is provided a remote control device for a remotely controlled device, the remote control device including:
  a housing;
  a first input controller, extending from the housing, including a grippable body which a user is able to apply a force and torque thereto with a first hand in order to be able to control yaw, pitch and roll of a remotely controlled vehicle, wherein the first input controller generates one or more first input signals indicative of the force and the torque applied to the grippable body;
  a second input controller, extending from the housing, enabling a user to control, with a second hand, elevation of the remotely controlled device, wherein the second input controller generates one or more second input signals indicative of the elevation;
  a communication device; and
  a controller, located within the housing and electrically connected to the first input controller, the second input controller and the communication device, wherein the controller is configured to:
    receive the one or more first input signals and the one or more second input signals from the first input controller and the second input controller respectively and
    control the communication device for transmitting one or more output signals indicative of one or more commands based on the force and torque applied to the grippable body indicated by the one or more first input signals and the elevation indicated by the one or more second input signals.

In certain embodiments, the grippable body has a substantially spherical body having a stem that extends from the housing in a first direction, and wherein the second input controller includes a joystick that extends from the housing in a second direction which is substantially orthogonal to the first direction.

In certain embodiments, an upper portion of the housing has a recessed section locating the grippable body.

In certain embodiments, an upper surface of the grippable body is substantially aligned with a top surface of the housing.

In certain embodiments, the underside surface of the grippable body is substantially aligned with the joystick in a returned position.

In certain embodiments, the first input controller and second input controller are modular components which are releasably couplable to a portion of the housing and electrically couplable to the controller.

In certain embodiments, the remote control device includes a detachable signal generating module for generating the one or more output signals, wherein the controller includes an interface for releasably coupling the signal generating module to the remote control device, wherein the controller is configured to:
  transfer, via the interface and to the signal generating module, the one or more commands; and
  receive, via the interface and from the signal generating module, the one or more output signals for transmission via the communication device.

In certain embodiments, the controller is configured to transfer the one or more commands to the signal generating module via the interface in response to detecting the signal generating module being coupled to the interface.

In certain embodiments, the controller has stored in memory a plurality of user defined nodes, wherein the plurality of user defined nodes are used in an interpolating function for interpolating an output value based on an input value indicated by the one or more first input signals or the one or more second input signals, wherein the output value is used by the controller to generate the one or more commands, wherein the nodes are not evenly spaced.

In certain embodiments, the interpolating function is a Lagrange polynomial function, wherein the memory has stored therein a constant value for each user defined node, wherein each constant value is recalled from memory during interpolation of the output value.

In certain embodiments, the controller receives, via the communication device, the plurality of user defined nodes from another device.

In certain embodiments, the controller receives the plurality of user defined nodes from one of:
  a transceiver device associated with the peripheral device; and
  a processing system.

In a sixth aspect there is provided a system including:
  a transceiver device associated with a remotely controlled device, wherein the transceiver includes:
    a transceiver communication device;
    a transceiver interface to communicate with a controller of the remotely controlled device; and
    a transceiver controller configured to:
      transfer a request, via the interface to the controller of the remotely controlled device, for an identifier indicative of the remotely controlled device which the transceiver is associated therewith;
receive a response, via the interface from the controller of the remotely controlled device, indicative of the identifier; and
transfer a transceiver signal, via the communication device to a remote control device, indicative of the identifier; and the remote control device according to the fifth aspect, wherein a plurality of sets of user defined nodes for a plurality of remotely controlled devices, including the remotely controlled device, are stored in memory of the controller of the remote control device, wherein the controller is configured to select one of the sets of user defined nodes based on the identifier indicative of the remotely controlled device, wherein the selected set of user defined nodes are used in an interpolating function for interpolating an output value based on an input value indicated by the one or more first input signals to generate the one or more commands.

In a seventh aspect there is provided a system including:
a transceiver device associated with a remotely controlled device, wherein the transceiver includes:
a transceiver communication device;
a transceiver interface to communicate with a controller of the remotely controlled device;
a transceiver controller including a memory having stored therein a plurality of sets of user defined nodes for a plurality of remotely controlled device including the remotely controlled device, wherein the transceiver controller is configured to:
transfer a request, via the interface to the controller of the remotely controlled device, for an identifier indicative of the remotely controlled device which the transceiver is associated therewith;
receive a response, via the interface from the controller of the remotely controlled device, indicative of the identifier;
select, based on the identifier, a set of user defined nodes for the remotely controlled device from the plurality of sets of user defined nodes; and
transfer a transceiver signal, via the communication device to a remote control device, indicative of the selected set of user defined nodes for the remotely controlled device; and the remote control device according to the fifth aspect, wherein the controller is configured to:
receive, via the communication device, the transceiver signal;
store the selected set of user defined nodes indicated by the transceiver signal in memory; and
use the selected set of user defined nodes for generating the one or more commands.

In certain embodiments, the request for the identifier indicative of the remotely controlled device is initiated in response to the transceiver receiving an initialisation signal from the remote control device.

In a ninth aspect there is provided a system including:
the remote control device according to the fifth aspect; and
a processing system in wired or wireless communication with the remote control device, wherein the processing system is configured to:
receive, via an input device of the processing system, a plurality of user defined nodes; and
transfer, to the remote control device, the user defined nodes, wherein the user defined nodes are used in an interpolating function to interpolate an output value based on one of the first and second input signals, wherein the interpolated output value is used to generate the one or more output commands.

In certain embodiments, the processing system is a mobile communication device executing a mobile communication device application.

BRIEF DESCRIPTION OF THE PREFERRED EMBODIMENTS

Example embodiments should become apparent from the following description, which is given by way of example only, of at least one preferred but non-limiting embodiment, described in connection with the accompanying figures.

DETAILED DESCRIPTION

Figure 1:
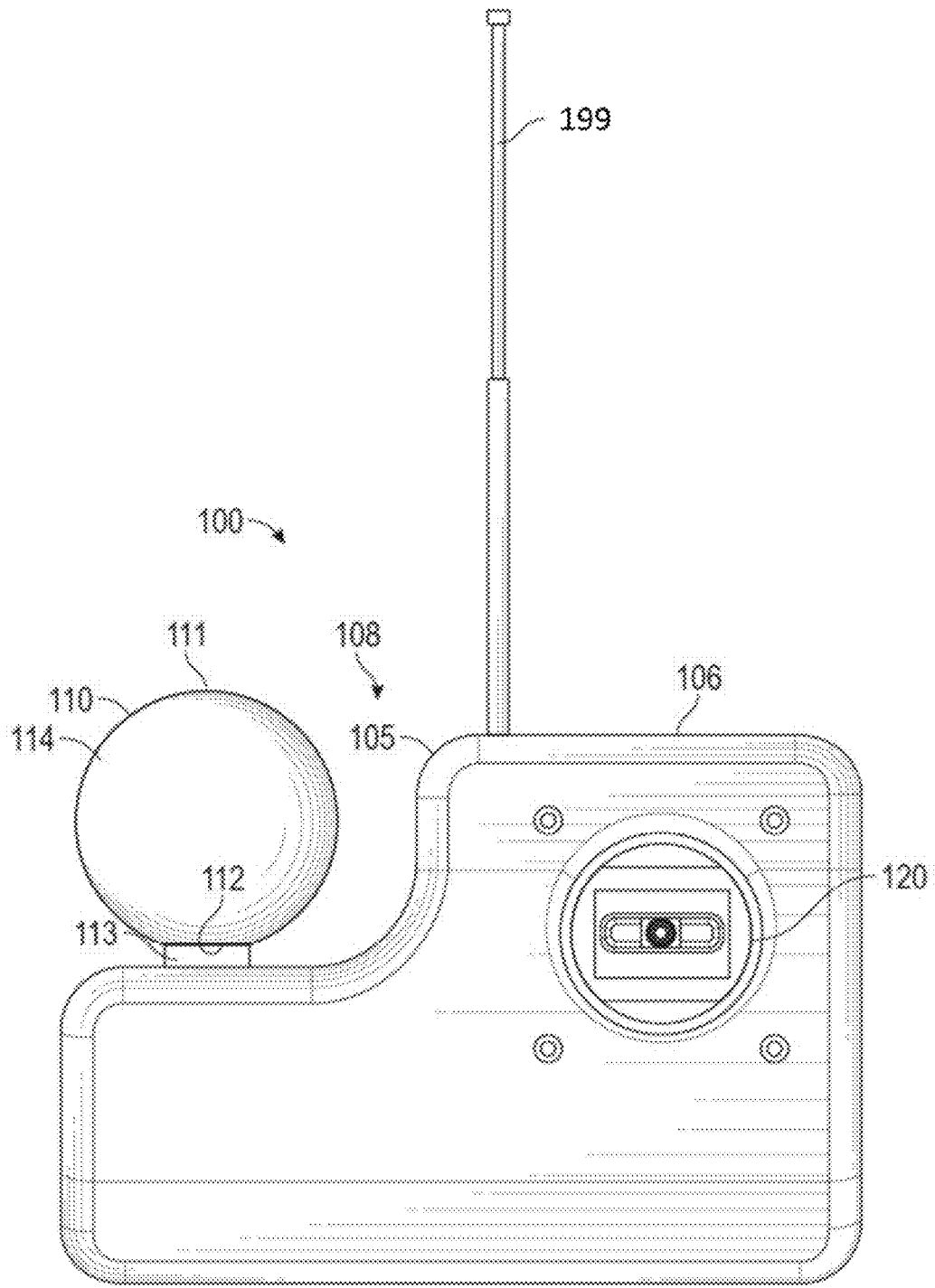
FIG. 1 is a front perspective view of an example of a remote control device.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

Figure 2:
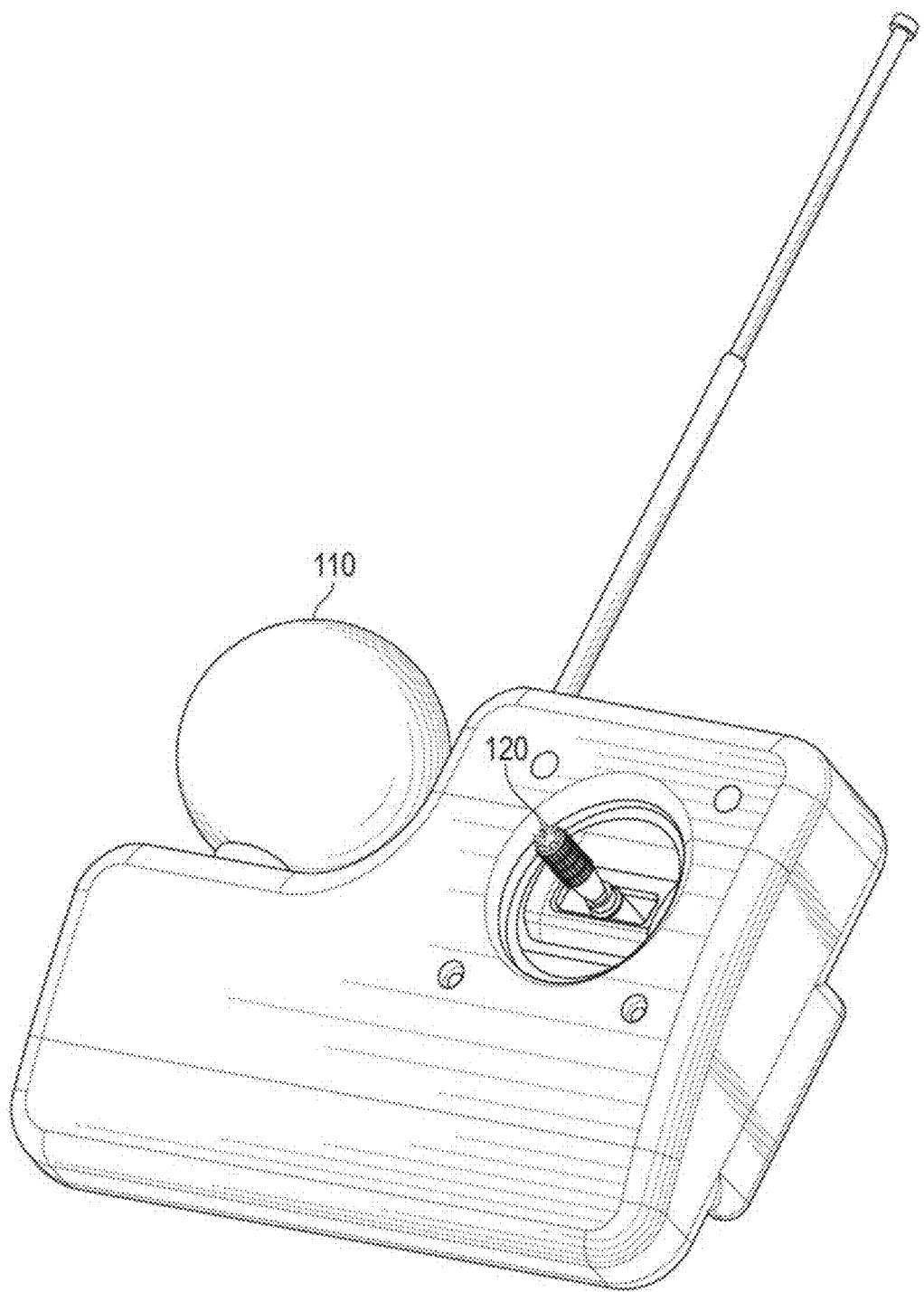
FIG. 2 is a right front perspective view of the remote control device of FIG. 1.
Figure 3:
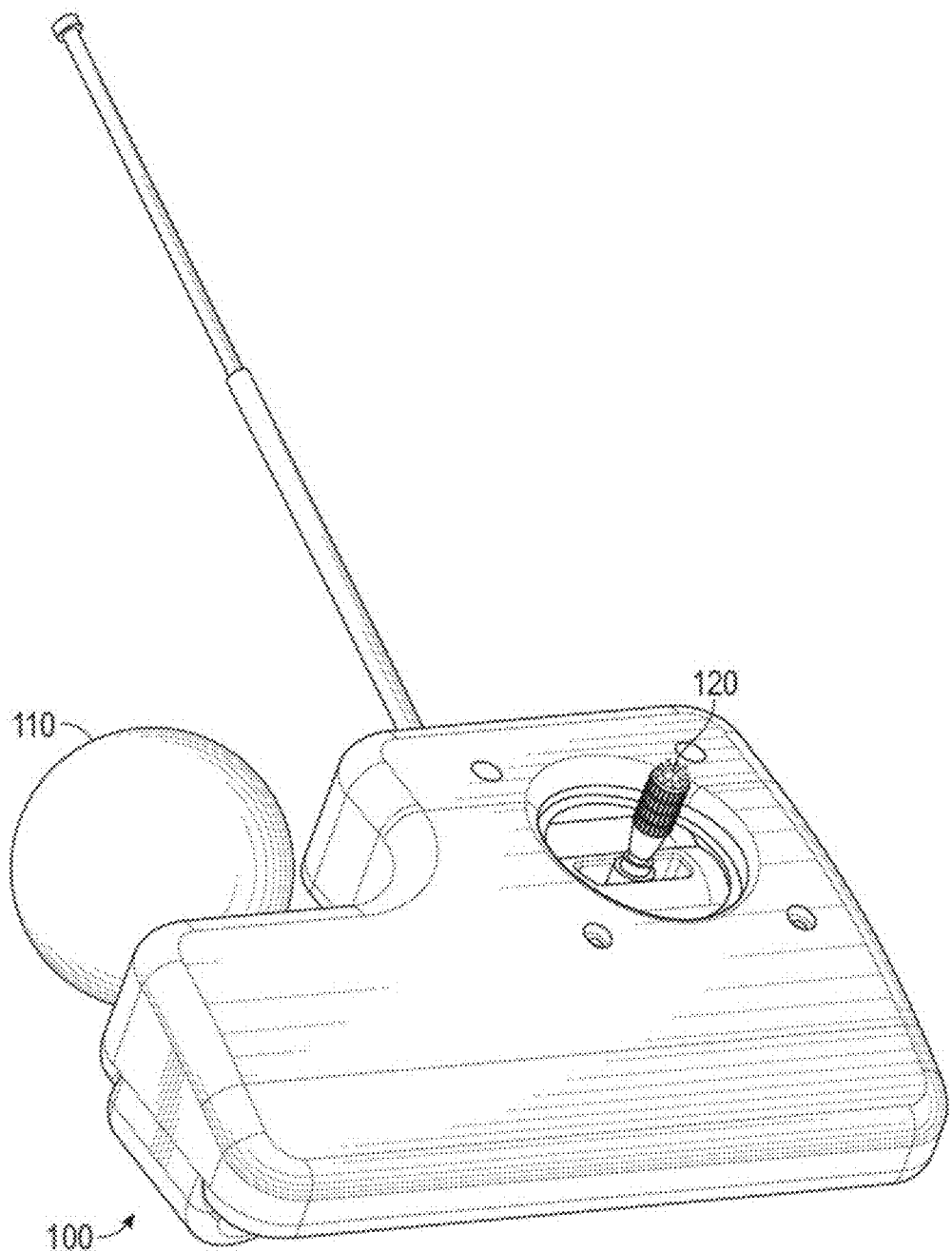
FIG. 3 is a left front perspective view of the remote control device of FIG. 1.
Figure 4:
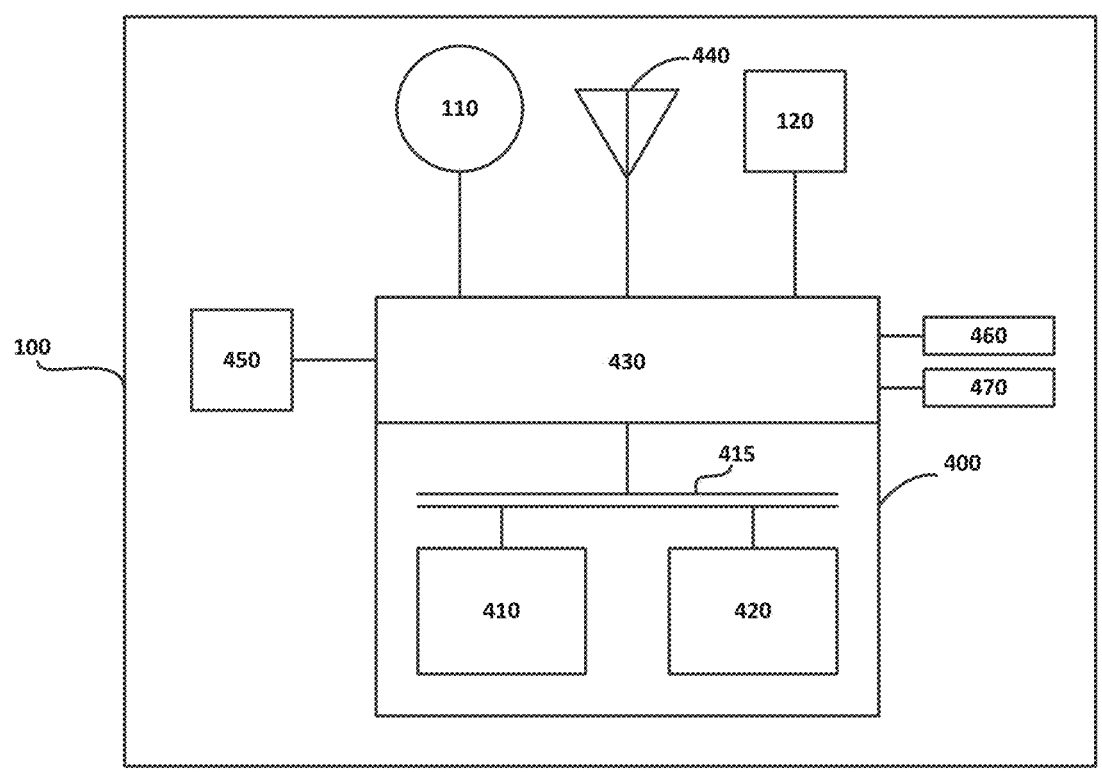
FIG. 4 is a system diagram of an example of the remote control device.
Figure 5:
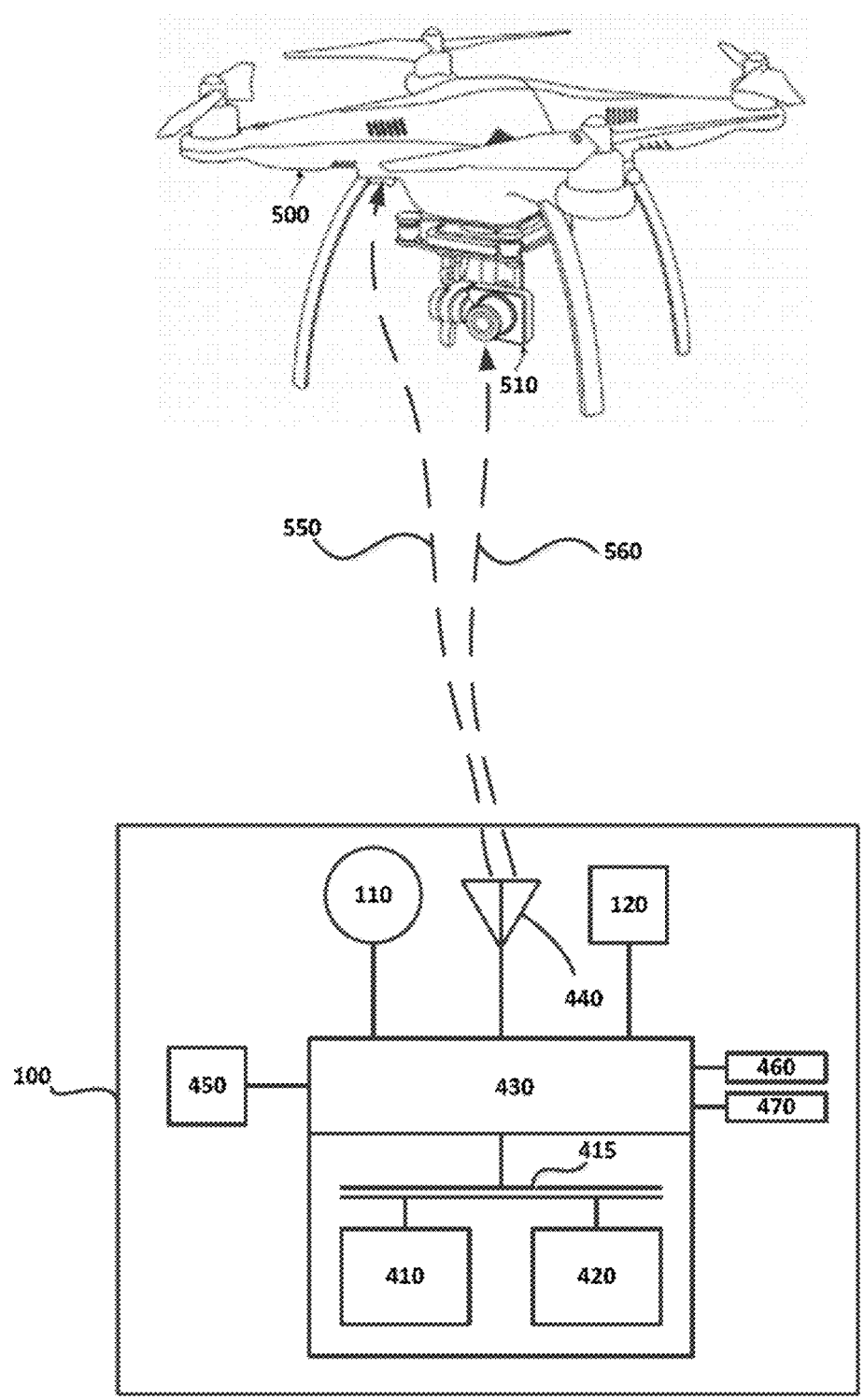
FIG. 5 is a system diagram of an example system using an example of remote control device.

Referring to FIGS. 1 to 3, there is shown schematics of an example remote control device 100 for controlling a remotely controlled device 500 (see FIG. 5). The remote control device 100 includes a housing 105, a first input controller 110, a second input controller 120, a communication device 440, and a controller 400 (see FIG. 4).

More specifically, the first input controller 110 extends from the housing 105 in a first direction. The first input controller 110 includes a grippable body 114 which a user is able to apply a force and/or a torque thereto with a first hand in a three-dimensional sense in order to be able to control yaw, pitch and roll movement of the remotely controlled device 500. Preferably, the user is able to apply a force and a torque to the grippable body 114. In a preferred embodiment, the first input controller 110 is provided in the form a three dimensional force and torque converter as will be described in further detail in relation to FIGS. 9 to 14. In particular, the first input controller generates a first input signal indicative of a three dimensional force vector and a three dimensional torque vector.

The second input controller 120 extends from the housing 105 in a second direction. The second input controller 120 enables a user to control, with a second hand, a peripheral device 510 (see FIG. 5) mounted to the remotely controlled device 500. Alternatively, the second input controller 120 enables a user to control elevation of the remotely controlled device 500. It will be appreciated that elevation can be positive elevation or negative elevation.

The controller 400 is located within the housing 105 and electrically connected to the first input controller 110, the second input controller 120 and the communication device 440.

As shown in FIG. 4, the controller 400 is generally provided in the form of a processing system such as a microcontroller including a processor 410, a memory 420, and an interface 430 coupled together via a bus 415. The controller 400 is configured to receive a first input signal and a second input signal from the first input controller 110 and the second input controller 120. The controller 400 is also configured to control the communication device 440 to transmit a first output signal 550 indicative of a remotely controlled device command based on the first input signal and a second output signal 560 indicative of a second command indicative of elevation adjustment or a peripheral device command.

As at least the yaw, pitch and roll movement of the remotely controlled device are controlled using a single hand which interacts with the first input controller, a far more intuitive input controller is provided particularly for beginners. Spatially, users find a greater intuitive feel for controlling the yaw, pitch and roll of the remotely controlled device using a single input controller such as a grippable body 114 where the user can apply a force and a torque to control these movement components. As the first input controller 110 enables three dimensional control of the remotely controlled device 500 via movements such as twisting in clockwise or anticlockwise directions, pushing or pulling the body, and left or right movement of the body 114, the user is provided with a more intuitive controller for controlling the directional movement of the remotely controlled device 500.

Figure 18:
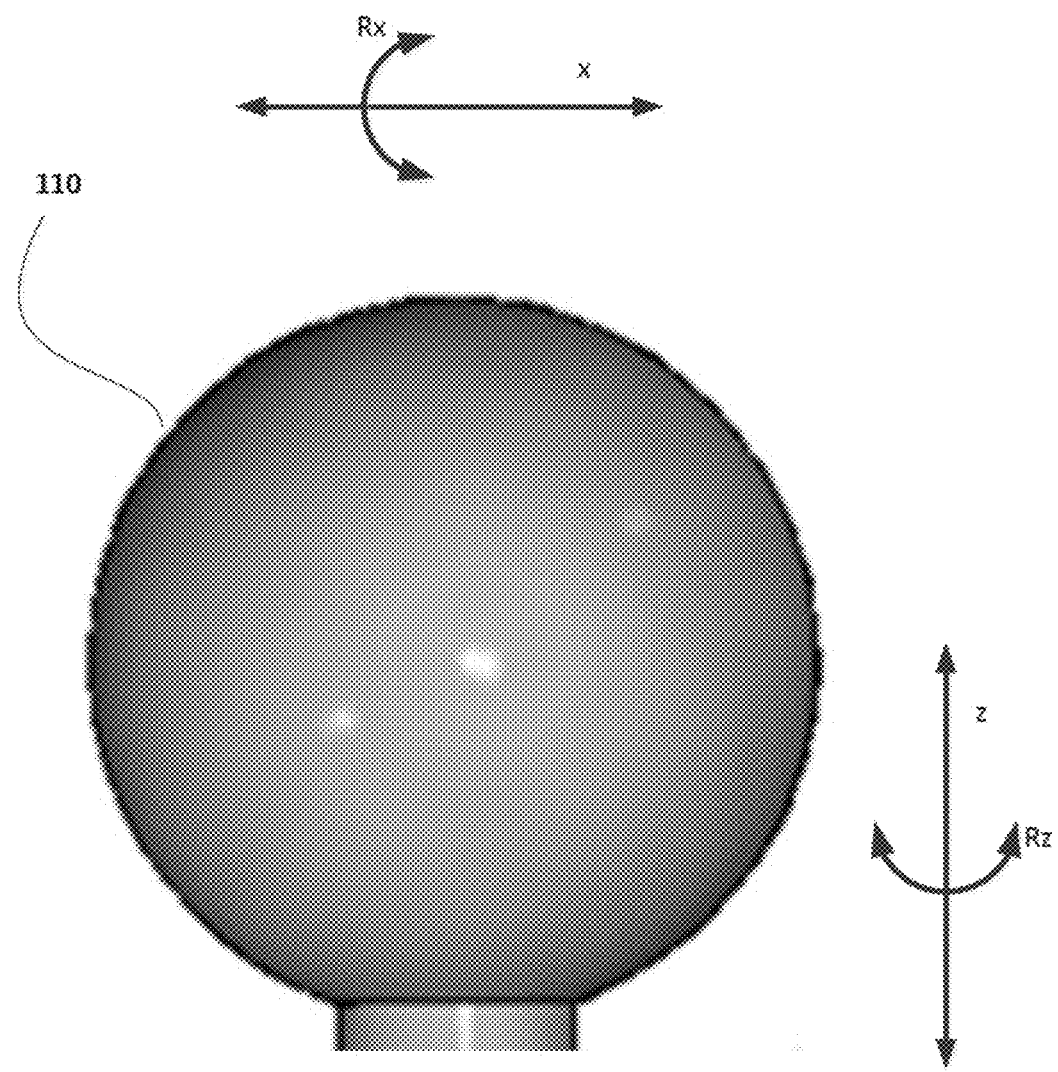
FIGS. 18 and 19 show a schematic of the forces and torques sensed by the first input controller of the examples of the remote control device.
Figure 19:
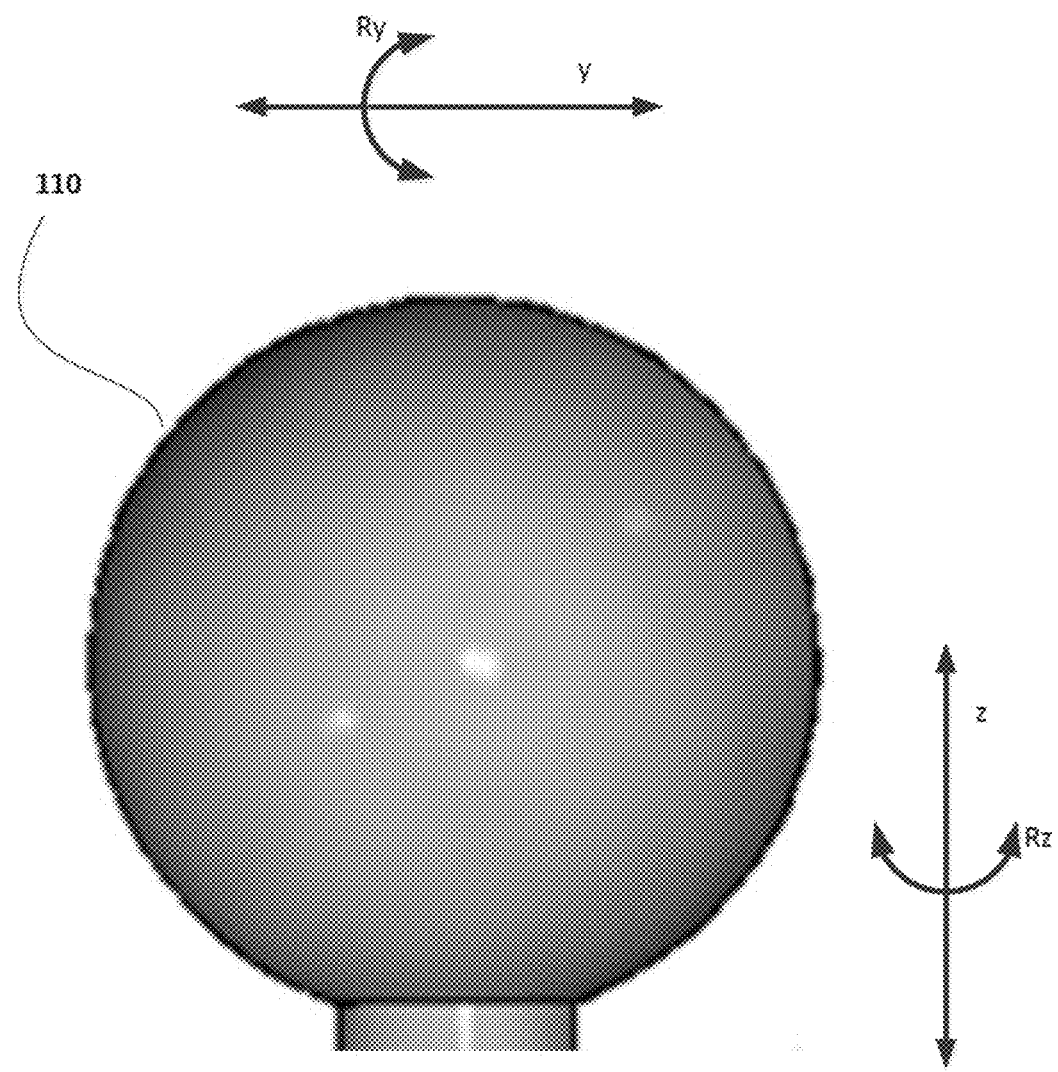

As mentioned above, in some instances where elevation can be controlled via the second input controller. However, in instances where the second input controller controls the peripheral device, the first input controller can also allow the user to control the elevation of the remotely controlled device. For example, as shown in FIGS. 18 and 19, roll adjustment can be indicated by the user applying force to the grippable body in a left or right direction along the x-axis, pitch adjustment can be indicated by the user applying force to the grippable body in a forward and backward direction along the y axis, yaw adjustment can be indicated by twisting the grippable body in a clockwise or anticlockwise as shown by arrow Rz about the z axis, and elevation can be indicated by pulling or pushing the grippable body upward or downward direction along the z axis. It will be appreciated that the user can change the specific configuration. For example, a separate processing system can be used to define configuration data which is transferred to and stored by the controller in memory of the remote control device 100 so as to adjust which movement component is adjustable along or about particular axes.

Furthermore, due to a single hand being able to control yaw, pitch and roll, the user's second hand can be free to control the second input controller 120 so as to control the peripheral device 510 whilst simultaneously still being able to control the remotely controlled device 500 using their first hand operating the first input controller 110. In particular embodiments, the elevation of the remotely controlled device can be self-maintained (e.g. the controller of the remotely controlled device may include a pressure sensor to maintain an elevation whilst yaw, roll and pitch can be controlled by the user's first hand and the peripheral device is controlled by the user's second hand. The remote control device 100 can include an input device 460 such a button which the user can select to change the mode of the remotely controlled device to an auto-pilot mode where the elevation of the is self maintained by the controller of the remotely controlled device.

Further referring to FIG. 4, the controller 400 includes a power source 450 generally provided in the form of a rechargeable battery, and can optionally include one or more input devices 460 and one or more output devices 470. Preferably, whilst not shown, the housing 105 can provide a power switch to turn the remote control device on and off.

The communication device 440 is a wireless communication device including an antenna 199, such as a telescopic antenna which extends from the housing. In one particular form, the wireless communication device 440 operates within the ISM (industrial, scientific and medical) frequency bands which include the 2.4 GHz or 900 MHz frequencies.

In one particular form, the grippable body 114 of the first input controller 110 has a substantially spherical body having a stem 113 that extends from the housing 105 in a first direction. More specifically, the stem 113 extends between the housing 105 and a small flattened base surface 112 of the grippable body 114. As shown in FIG. 18, the first input controller can provide a first input signal indicative of a plurality of values such as x, y and z values indicative of the instantaneous translation of the first input controller and Rx, Ry and Rz values in relation to the instantaneous rotation amount about the respective x, y and z axes of the first input controller.

The second input controller 120, as exemplified in FIGS. 1 to 3, can be provided in the form of a joystick. The joystick extends from the housing 105 in a second direction which is substantially orthogonal to the first direction. The orthogonality of the first and second controllers are advantageously comfortable and intuitive for the user. In one form, the joystick can move in two axes. In one form, the joystick may be configured to be biased toward a centre position in either the first axis or second axis.

As shown in FIGS. 1 to 3, an upper portion of the housing 105 has a recessed section 108 locating the grippable body 114. Furthermore, an upper surface 11 of the grippable body 114 is substantially aligned with a top surface 106 of the housing 105. The underside surface of the grippable body 114 is also substantially aligned with the joystick in a returned position. This arrangement of the input controllers 110, 120 has also been found advantageously comfortable and intuitive for the user.

Figure 15:
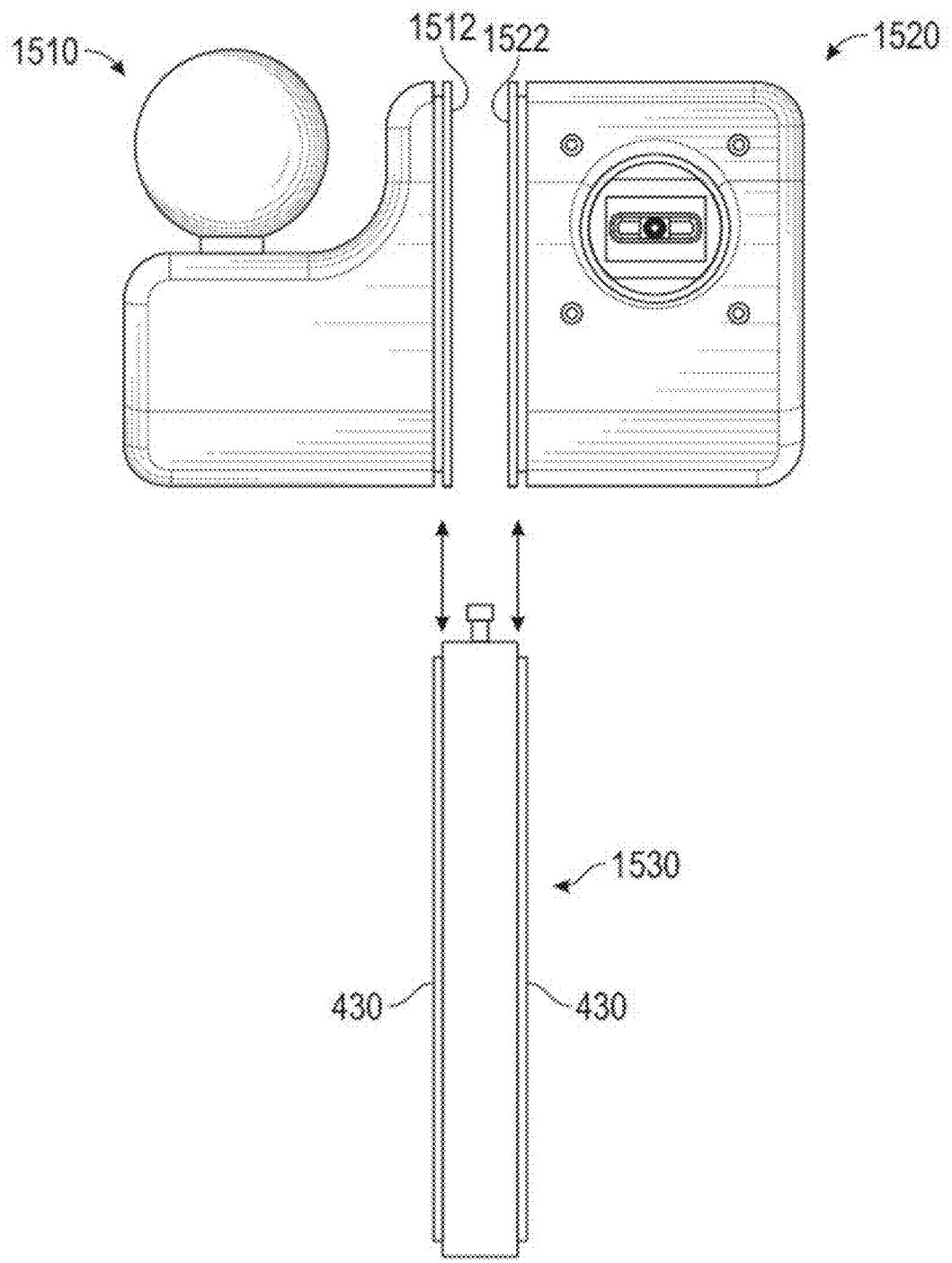
FIG. 15 shows an disassembled front view of the a further example of the remote control device.
Figure 16:
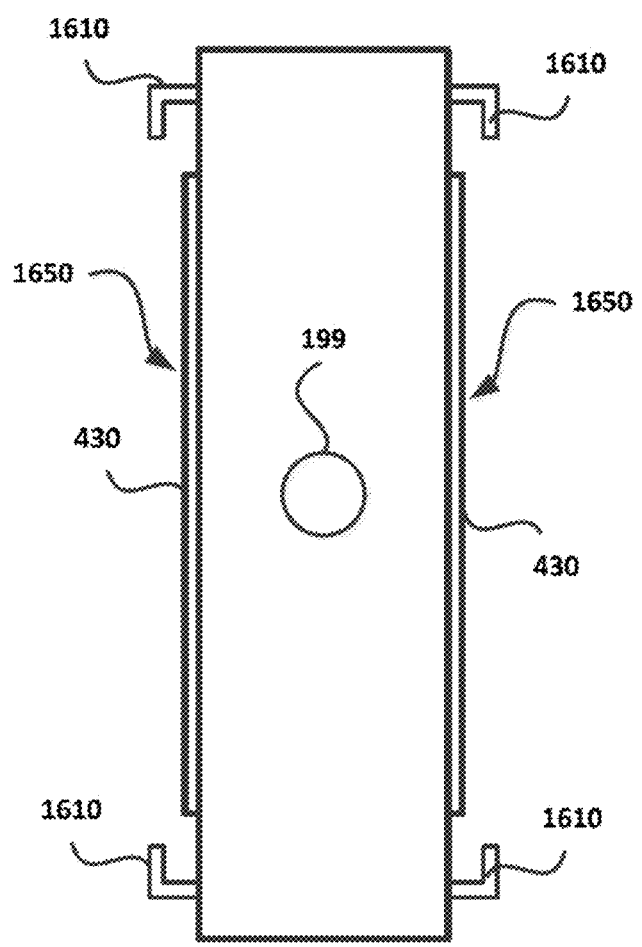
FIG. 16 is a plan view of a central component of the remote control device in a disassembled state.
Figure 17:
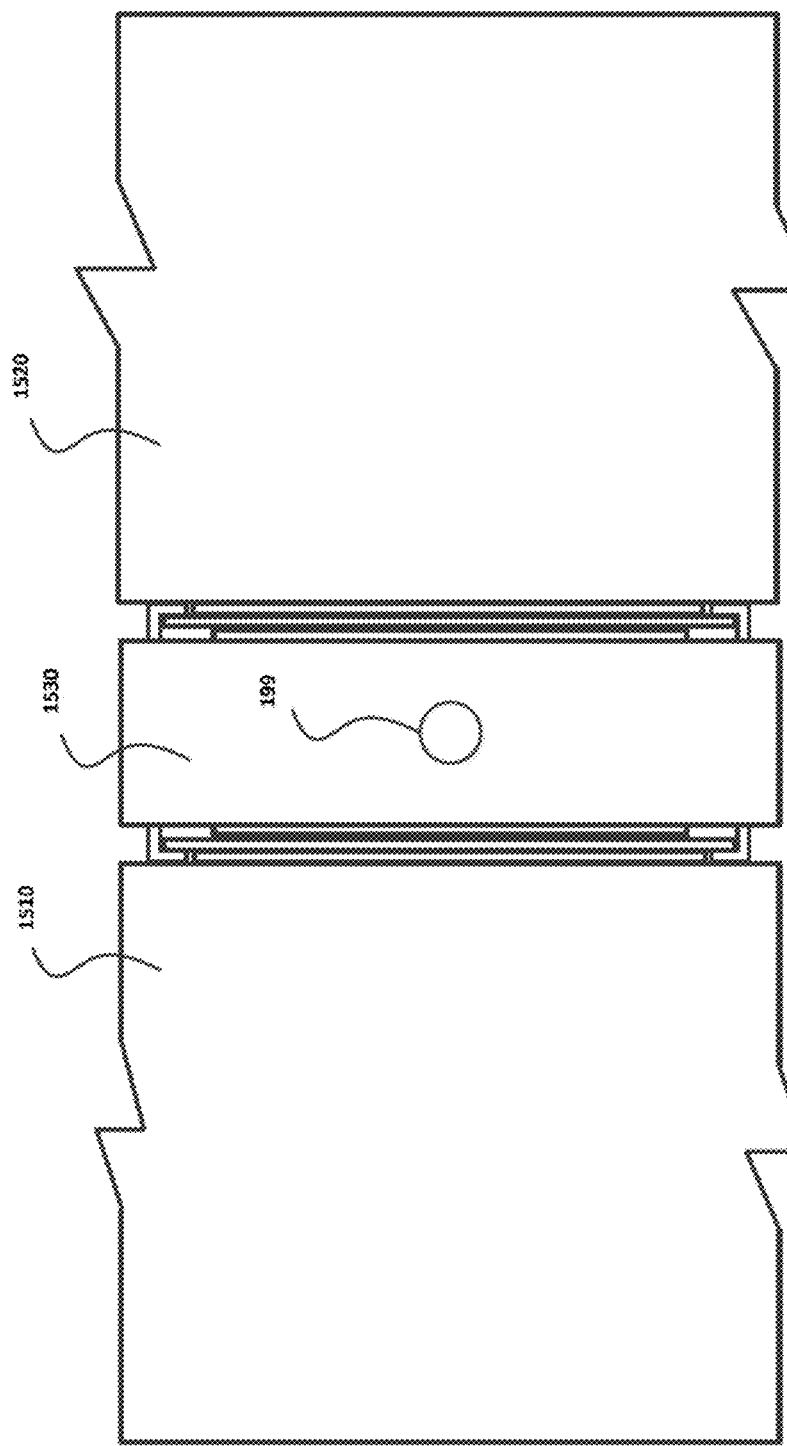
FIG. 17 shows a plan view of the remote control device of FIG. 15 in an assembled state.

In one embodiment, the first input controller 110 and second input controllers 120 can be integrated with the housing 105 such that the controllers 110, 120 are permanent. However, in an alternate embodiment as shown in FIGS. 15, 16 an 17, the input controllers 110, 120 are modular components 1510, 1520 which can be releasably coupled to a central component 1530 and electrically couplable to the controller 400. In particular, a central module 1530 of the remote control device 100 can include the controller 400 and communication device 440. A first modular component 1510 including the first input controller 110 can be coupled to the central module 1530 of the remote control device 100. Furthermore, a second modular component 1520 including the second input controller 120 can be coupled to the central module 1530 of the remote control device 100. An interface 1512, 1522 of the first and second modular components electrically connect with an interface 430 of the controller 400 such that electrical signals from the first and second input controller 110, 120 are transferred via the respective interfaces to the controller 400. This modular aspect of the remote control device 100 is particularly advantageous if different types of input controllers wish to be used. For example, the user may wish to interchange different types of peripheral devices 510 to the remotely controlled devices 500, such as a camera device and a video camera device. Dedicated second input controller modules 120 can be provided for each peripheral device 510 such that when the user interchangeably mounts a camera device for a video camera device, the user can also decouple, from the first portion of the housing 100, a first type of second modular component for controlling the video camera device and couple a second type of second modular component for controlling the camera device. As shown in FIG. 16, the central component can include a pair of channel barriers 1610 which accept a T-shaped interface projection 1512, 1522 from each modular controller 1510, 1520. The interface projection 1512, 1522 of each modular controller 1510, 1520 is slidably received within a channel defined by the channel barriers 1610.

In certain embodiments, the remote control device 100 may be used to control a remotely controlled device 500 which uses a proprietary protocol for generating the signals 550, 560 which are transferred to a receiver or transceiver 610 (see FIG. 6) of the remotely controlled device 500. As such, a first signal generating module 630 can be releasably coupled to the interface 430 of the controller 400 for generating the first signal. In particular, the controller 400 is configured to transfer, to the first signal generating module 630 via the interface 430, the generated remotely controlled device command based on the first input signal of the first input controller 110. The controller 400 can be configured to transfer the remotely controlled device command to the first signal generating module 630 via the interface 430 in response to detecting the signal generating module 630 being coupled to the interface 430. The first signal generating module 630 includes a controller executing proprietary software stored in memory for generating the first signal based on the received remotely controlled device command. The controller of the first signal generating module 630 then transfers, via the interface 430, the generated signal to the controller 400 for transmission via the communication device 440. Advantageously, this enables manufacturers of remotely controlled devices which utilise proprietary protocols to provide the first signal generating module 630 to enable the remote control device 100 to be used for controlling their respective remotely controlled device 510.

Similarly, the remote control device 100 can include a second signal generating module 640 for releasable coupling to the interface 430 of the controller 400. The controller 400 is configured to transfer, via the interface 430 and to the second signal generating module 640, the peripheral device command. Again, the controller 400 can be configured to transfer the peripheral device command to the second signal generating module via the interface 430 in response to detecting the second signal generating module 640 being coupled to the interface 430. The controller 400 then receives, via the interface 430 and from the second signal generating module 640, the second signal for transmission via the communication device 440. The second signal generating module 640 includes a controller executing proprietary software stored in memory for generating the second signal based on the received peripheral device command. The controller of the second signal generating module 640 then transfers, via the interface 430, the generated second signal to the controller 400 of the remote control device 100 for transmission via the communication device 440.

In preferred embodiments, the controller 400 has stored in memory one or more user defined nodes for defining one or more user response functions for the generating at least one of the remotely controlled device command and the peripheral device command. In a preferred form, at least some of the one or more user response functions are non-symmetric user response functions. As such, for example, the user does not need to use the same amount of input (i.e. force and/or torque) using the first input controller to increase and decrease the yaw of the remotely controlled device.

Each user response function transforms and/or maps one or more of the values indicated by the first input signal to a first command or one or more of the values indicated by the second input signal to a second command.

Figure 6:
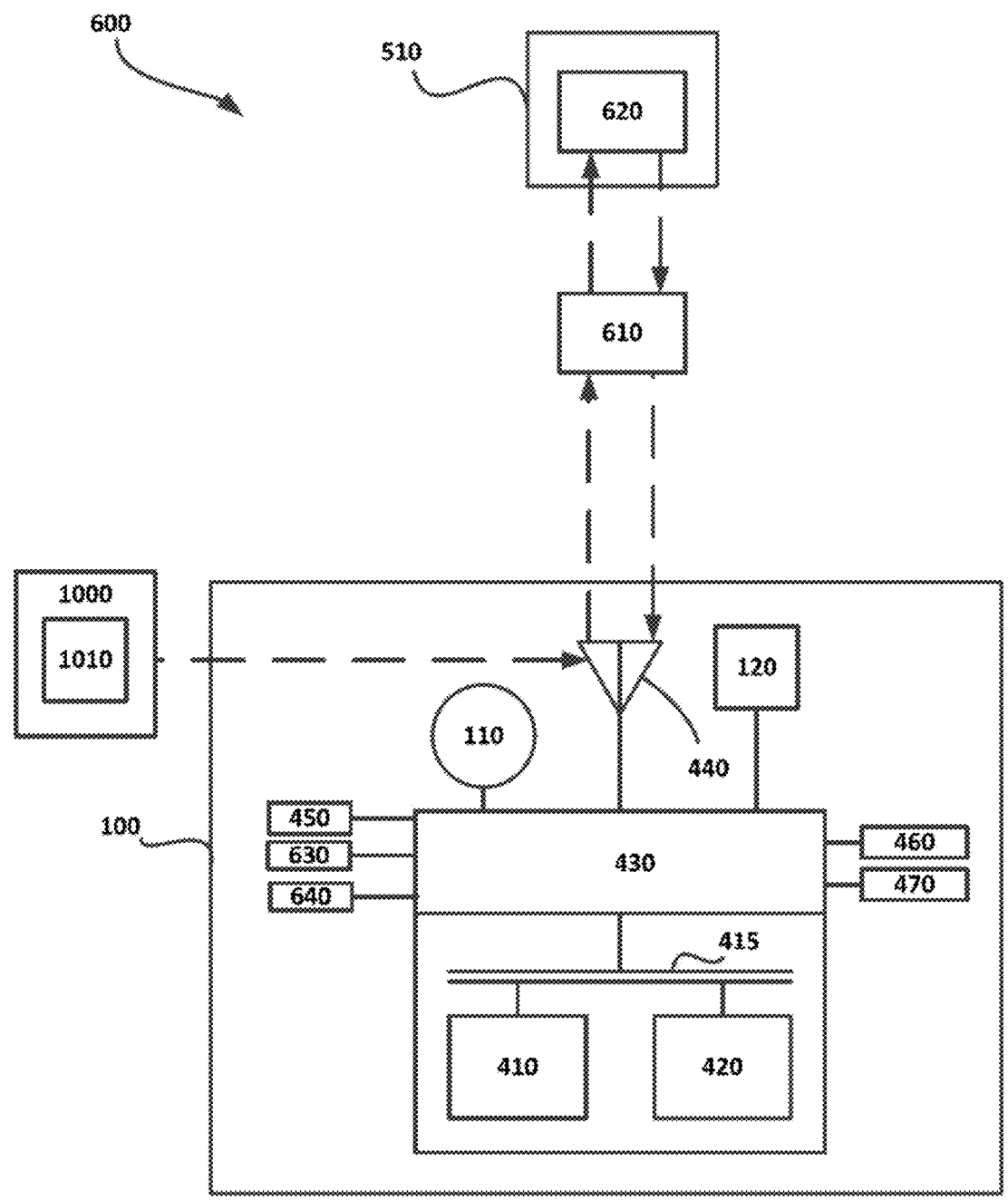
FIG. 6 is a system diagram of the system of FIG. 5 showing the transfer of data between the remote control device, a transceiver, and a controller of the remotely controlled device.

In one form, the controller 400 of the remote control device 100 receives, via the communication device 400, a plurality of user defined nodes used in an interpolating function from another device. For example, as shown in FIG. 6, the plurality of user defined nodes can be received from a transceiver device 610 associated with the remotely controlled device 510 or a mobile processing system 1000 such as a smart phone, computer, etc., which execute a computer program 1010. The transfer of data between the remote control device and the other computerised device can be wireless or via a wired medium.

Figure 7:
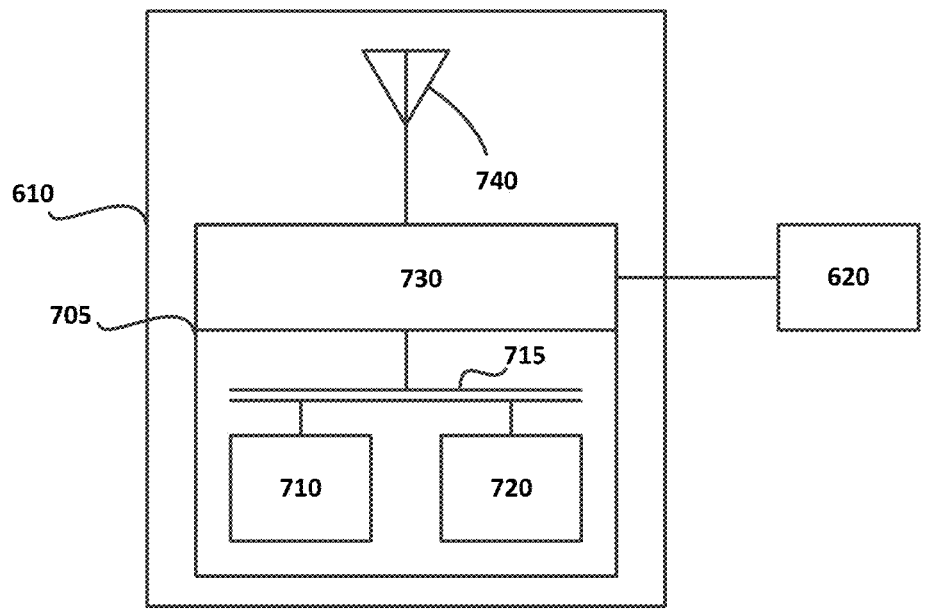
FIG. 7 is a functional block diagram of an example of a transceiver associated with the remotely controlled device.

Continuing with FIG. 5 there is shown a block diagram of a system 600 including an example of the remote control device 100. The system 600 further includes a transceiver device 610 associated with the remotely controlled device 510. As shown in FIG. 7, the transceiver device includes a transceiver communication device 740, a controller 705 including a transceiver interface 730 to communicate with a controller 620 of the remotely controlled device 510. The transceiver controller 705 includes a processor 710, a memory 720 and the interface 730 coupled together via the bus 715. The transceiver controller 705 is configured to transfer a request, via the interface 730 to the controller 805 (see FIG. 8) of the remotely controlled device 510, for an identifier indicative of the remotely controlled device 510 which the transceiver 610 is associated therewith. The remotely controlled device controller 805 can then determine/retrieve from memory 820 the identifier indicative of the remotely controlled device 500. The identifier may be unique for the device 510, but it could be a model type which may not unique amongst all remotely controlled devices.

The transceiver controller 705 can then receive a response, via the interface 730 from the remotely controlled device controller 805, indicative of the identifier. The transceiver 610 can then generate and transfer a transceiver signal, via the communication device 740 to the remote control device 100, indicative of the identifier. The remote control device 100 can have stored in memory a plurality of sets of user defined nodes that define one or more user response functions for a plurality of remotely controlled devices, including the remotely controlled device 510. The controller 400 of the remote control device 100 is configured to select one of the sets of user defined nodes based on the identifier indicative of the remotely controlled device 510. At least one set of nodes is used to generate the remotely controlled device command. Advantageously, the user does not need to scroll through menus and interfaces to select a set of nodes to be used, but rather the transceiver controller 705 automatically indicates to the remote control device 100 the set of nodes to be used. The request for the identifier can be initiated by the transceiver 610 in response to the transceiver 610 receiving an initialisation signal from the remote control device 100.

In another embodiment, rather than the plurality of sets of nodes being stored at the remote control device 100, the transceiver 610 can have stored in memory 720 the plurality of sets of nodes. In response to receiving the identifier of the remotely controlled device 100, the transceiver controller 705 is configured to select, based on the identifier, a set of user defined nodes for the remotely controlled device 510 from the plurality of sets of user defined nodes. In particular, each set of user defined nodes is associated with the identifier of the remotely controlled device 510 in memory 720 of the transceiver controller 705. The transceiver controller 705 then transfers a transceiver signal, via the communication device 740 to the remote control device 100, indicative of the selected set of user defined nodes for the remotely controlled device 100. The controller 400 of the remote control device 100 can be configured to receive, via the communication device 440, the transceiver signal, store the selected set of user defined nodes indicated by the transceiver signal in memory 420, and then use at least some of the user defined nodes in a function stored in memory 420 for generating the remotely controlled device command. In addition to the advantageous aspects of this configuration regarding the automatic determination of the set of user defined nodes to be used for the particular remotely controlled device 510 to be controlled, this specific configuration is also advantageous if the remote control device 100 malfunctions since the user can obtain a new remote control device 100 which can then obtain the customised user defined nodes from the transceiver 610 associated with the remotely controlled device 510.

As discussed above, at least some of the user response functions are non-symmetric user response functions. In one form, the user can operate a processing system 1000, which can communicate with the remote control device 100 wirelessly or via a wired medium, in order to define the nodes which in turn define the user response function(s). In particular, the processing system 1000 may be a mobile communication device such as a smart phone or the like executing an app 1010 stored in memory of the processing system 1000. The processing system can be configured to receive, via an input device of the processing system 1000, a plurality of nodes which define an input value sensed from input by the user using the first input controller (and potentially the second input controller) and an interpreted output value based on the input value. It will be appreciated that a plurality of node sets can be defined which thereby define a plurality of user response functions. At least one of the user response functions is a non-symmetric user response function which can be an interpolating function such as a Lagrange polynomial function that uses the nodes together with an input value indicated by the one or more first or second input signals to interpolate an output value. The processing system 1000 can then transfer, either wirelessly or via the wired medium and to the remote control device, the user defined nodes which are used in the Lagrange polynomial function, thereby defining a non-symmetric user-customized output response.

More specifically, the Lagrange polynomial is defined by Equations 1 and 2:

$$L(x) := \sum_{j=0}^{k} y_j l_j(x) \quad \text{Equation 1}$$

$$l(x) := \prod_{\substack{0 \leq m \leq k \\ m \neq j}} \frac{x - x_m}{x_j - x_m} \quad \text{Equation 2}$$

where k is defined as the number of nodes used to define this polynomial.

l(x) can be simplified to remove the division from the equation and then separated as shown below in Equation 3.

$$l(x) := \prod_{\substack{0 \leq m \leq k \\ m \neq j}} (x - x_m) \prod_{\substack{0 \leq m \leq k \\ m \neq j}} \left(\frac{1}{x_j - x_m}\right) \quad \text{Equation 3}$$

Based on Equation 3, $$\prod_{\substack{0 \leq m \leq k \\ m \neq j}} \left(\frac{1}{x_j - x_m}\right)$$

can be moved into L(x) such that:

$$l(x) := \prod_{\substack{0 \leq m \leq k \\ m \neq j}} (x - x_m) \quad \text{Equation 4}$$

and $$L(x) := \sum_{j=0}^{k} y_j l_j(x) \prod_{\substack{0 \leq m \leq k \\ m \neq j}} \left(\frac{1}{x_j - x_m}\right) \quad \text{Equation 5}$$

A portion of L(x), namely Z(x), can be defined as:

$$Z_j(x, y) = y_j \prod_{\substack{0 \leq m \leq k \\ m \neq j}} \left(\frac{1}{x_j - x_m}\right) \quad \text{Equation 6}$$

or $$Z_j = y_j \prod_{\substack{0<m<k \\ m \neq j}} \left(\frac{1}{x_j - x_m}\right) \qquad \text{Equation 7}$$

where Z is treated as a constant, such that:

$$L(x) := \sum_{j=0}^{k} Z_j l_j(x) \qquad \text{Equation 8}$$

Due to this rearrangement of the Lagrange polynomial, a constant Z for each node can be calculated and reused by the processor 410 of the controller 400 when interpolating an output value for a corresponding input value, thereby improving the remote control device's response to user input. More specifically, the nodes are stored as a Z(x) and x pairing. For example, when a user is defining a curve, they place nodes on a graph that has a x and y coordinate system, x being the input (the force or torque that is applied to the first or second input controller) and y being the output or the result. Once the user has defined the curve, the array of x and y points (the nodes) are placed into Z(x, y) and a corresponding Z value is determined for every x value that is defined.

The Z constants can be precalculated for each node by the separate processing system and then transferred to the controller for non-volatile storage in memory. Alternatively, the Z constants can be calculated by the processor 410 of the controller 400 initially and then retained in volatile storage for subsequent calculations such that the constant portion for each node is not recalculated for subsequent processing for further inputs provided by the user.

At time of operation (when force or torque is applied to the orb) the Z and x values are used to determine the y value using the interpolation, where executable instructions for performing interpolation using the Lagrange polynomial are stored in non-volatile storage. This process has been found to be very quick but is dependent on the number of points that the user has defined. During experimentation it has been found that less nodes are needed by a user to define a suitable response function compared to the Newton polynomial to achieve a similar response function which thereby results in efficiencies in processing the output for each input.

It will be appreciated that the exemplified remotely controlled device 510 can be many different types of devices. However, in one particular form, the remotely controlled device 510 may be a UAV. In this context, the peripheral device 520 may be a digital photographic camera, a digital video camera, a weapon, or the like which is mounted (releasably or fixed) to the UAV.

In particular embodiments, the user is able to define configuration settings including mapping control data which maps the various input controls from the first and/or second input controller 110, 120 to various remotely controlled device commands. For example, a push upwardly on the first input controller 110 may be defined by the user to be mapped to increase the throttle of a UAV, but alternatively the user may map this input to a different type of command. Furthermore, it can be possible to map the input signal received from the second input controller 120 to control the remotely controlled device 510. The mapping process may be performed using the processing system 1000 such as a smart phone, wherein the configuration data indicative of the mapping data is transferred to the remote control device 100 for storage in memory 420. Alternatively, the one or more buttons 460 and the one or more output devices 470 of the remote control device 100 can be used by the user to set the mapping data in memory 420.

Figure 8:
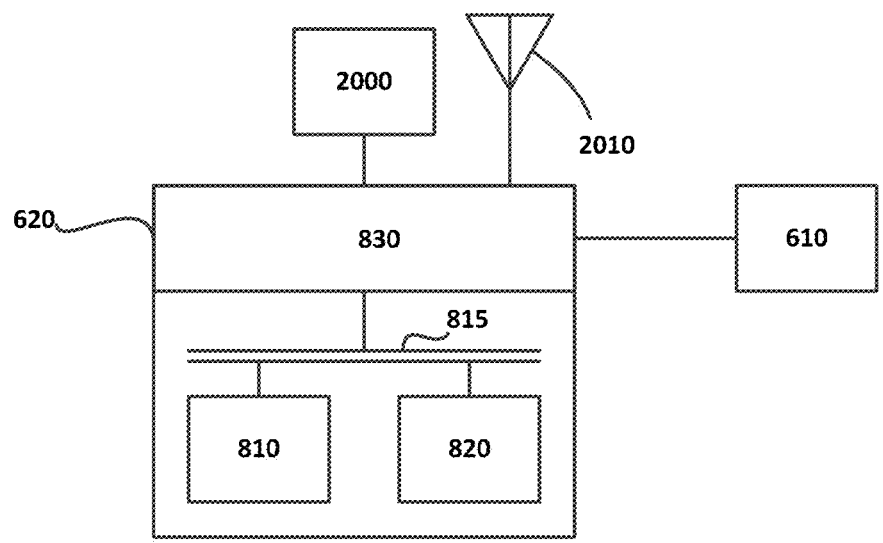
FIG. 8 is a functional block diagram of an example of the controller of the remotely controlled device.
Figure 9:
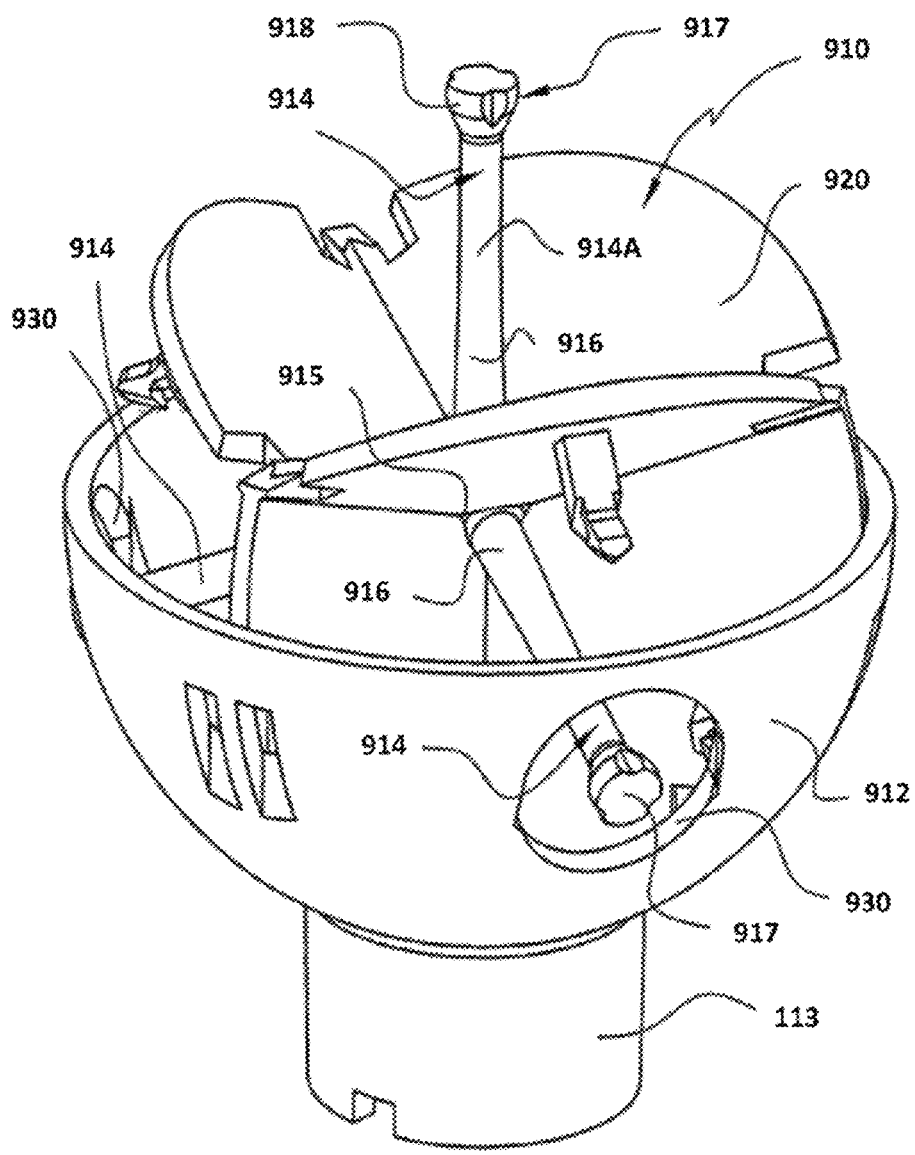
FIG. 9 is a schematic of an example of a first input controller in isolation from the remote control device.
Figure 10:
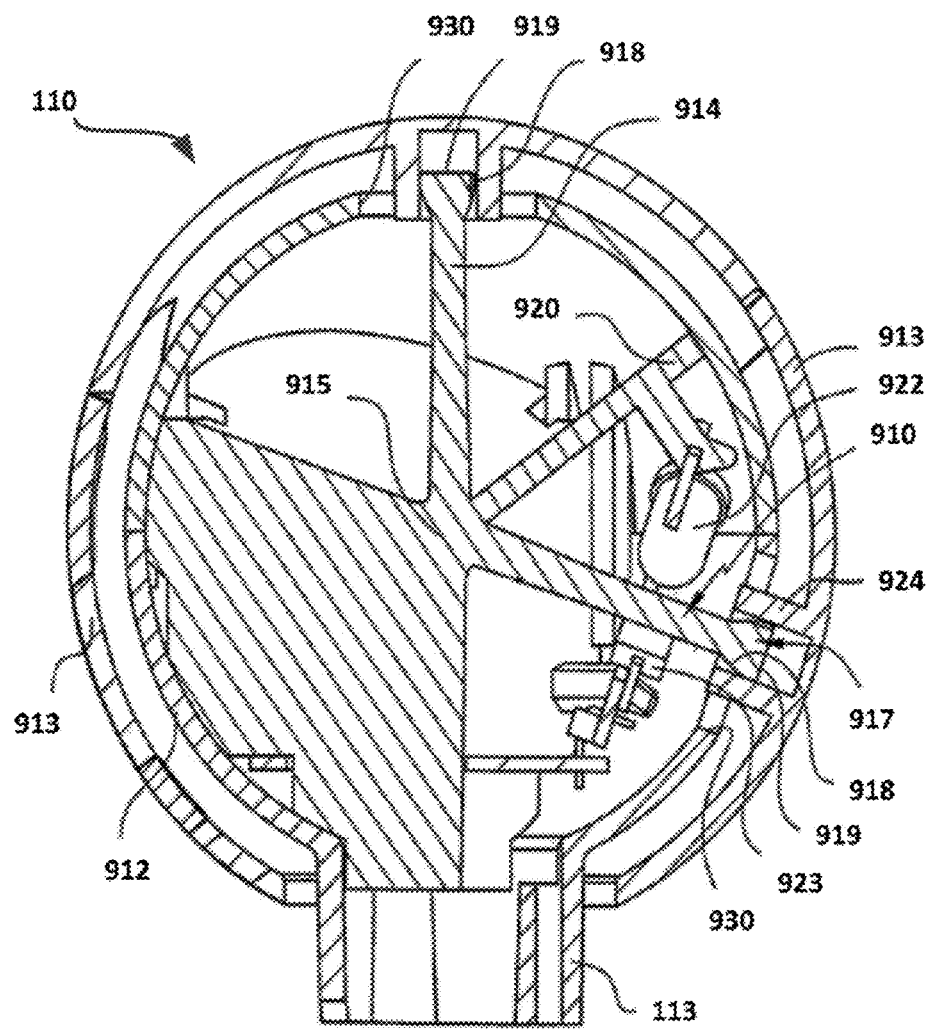
FIG. 10 is a vertical cross-sectional view through the first input controller of FIG. 9.
Figure 11:
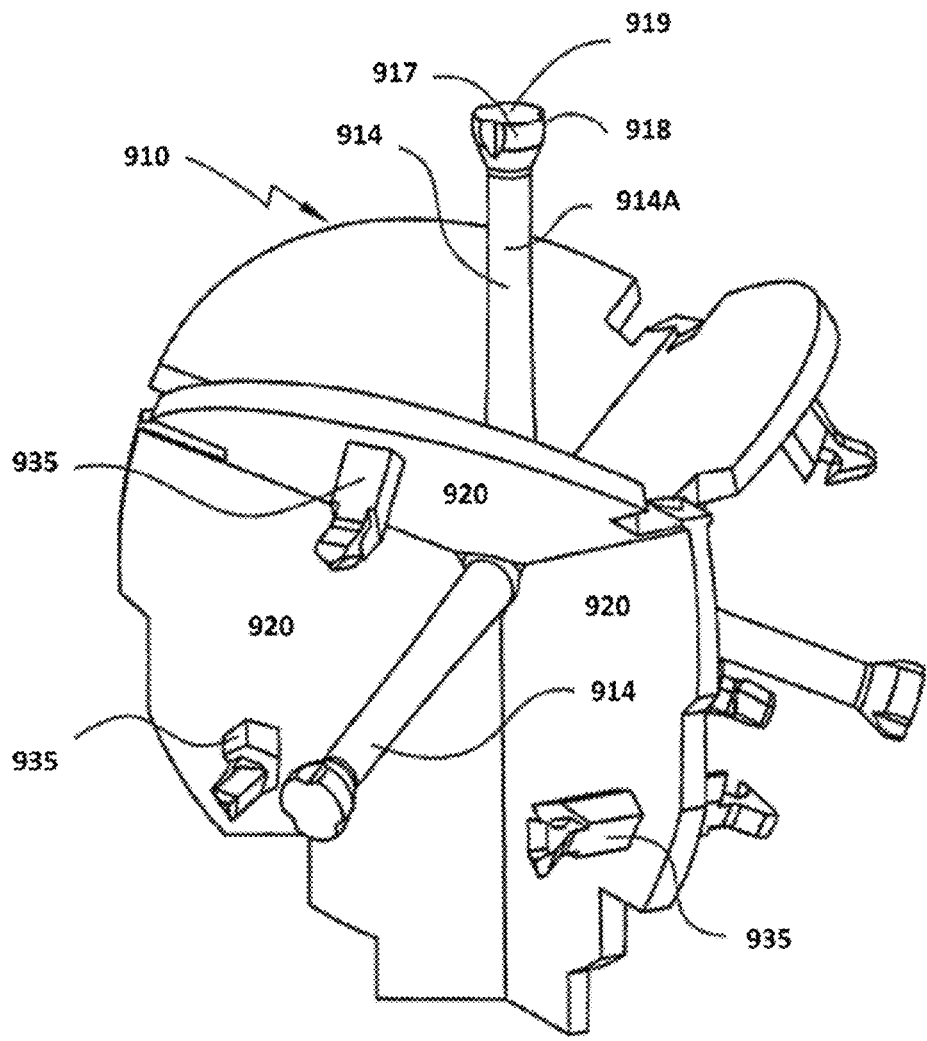
FIG. 11 is a schematic of an internal body of the first input controller of FIG. 9.
Figure 12:
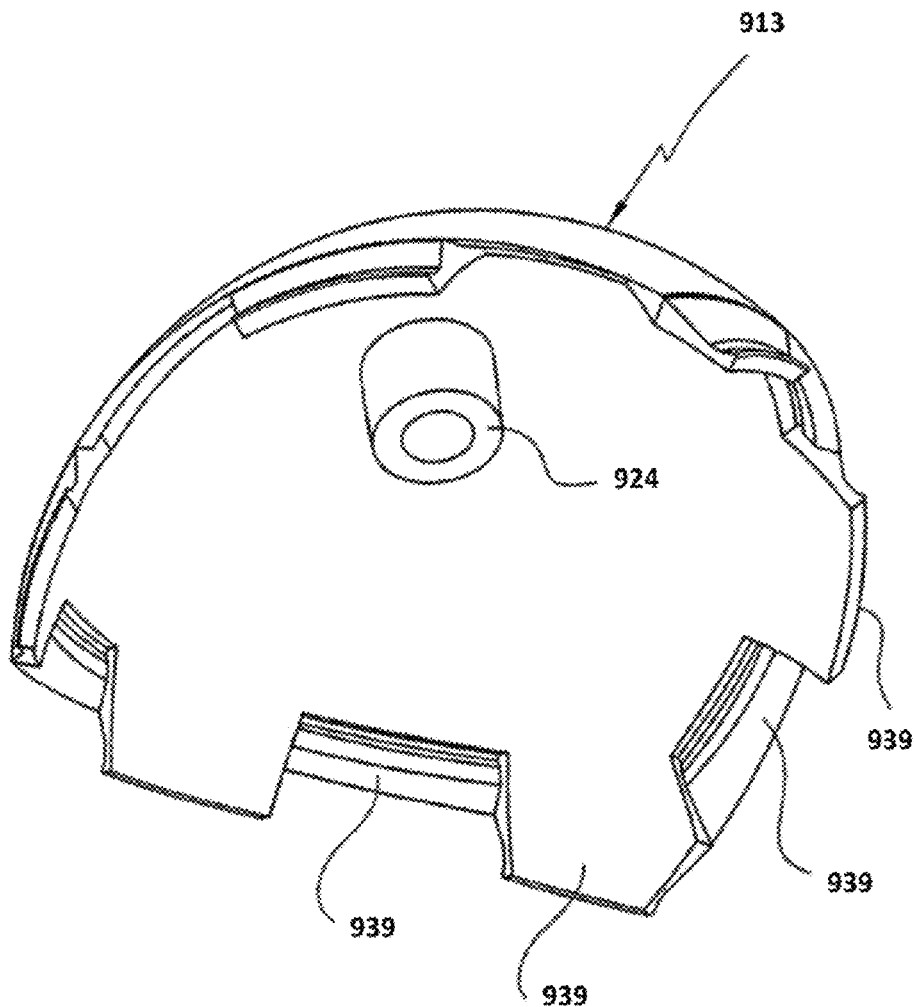
FIG. 12 is a schematic of a segment of a cap of the first input controller of FIG. 9.

For completeness. FIG. 8 shows a functional block diagram of the controller 620 of the remotely controlled device 510. The controller 620 includes a processor 810, memory 820, and an interface 830 coupled together by a bus 815. The transceiver 610 is coupled to the interface 830 of the controller 620. The controller can include a communication device 2010 for receiving signals from an alternate source other than the transceiver 610. A number of controllable components 2000 of the remotely controlled device 500 are coupled to the interface 830 for the controller 620 to control.

Referring to FIGS. 9 to 14 there is shown an example of the first input controller 110 in isolation of the remote control device 100.

In particular, the first input controller 110 includes an arm structure 910, an inner shell assembly 912 and an outer grippable body assembly 913 which forms the grippable body 114 for the user to provide input via the first input controller 110.

The arm structure 910 includes a plurality of arms 914 which are uniformaly geometrically spaced relative to each other. In a preferable form, the arm structure 910 includes four unformaly disposed arms 914. Each arm 914 has a tapered stem 914A and ends with an enlarged tip 917 having peripheral protrusions 918 and a flattened face 919. The arms 914 are connected together at their end portions 916 at a central connection 915 in a four pointed star configuration. The arm structure 914 includes structural webs 920, wherein each web 920 extends between neighbouring arms 914. The arrangement of the arms 914 of the arm structure 910 have a profile which corresponds to lines that extend from each vertex to a centroid of a regular tetrahedron. In one form, the arm structure is made from Polyoxymethylene.

Figure 13:
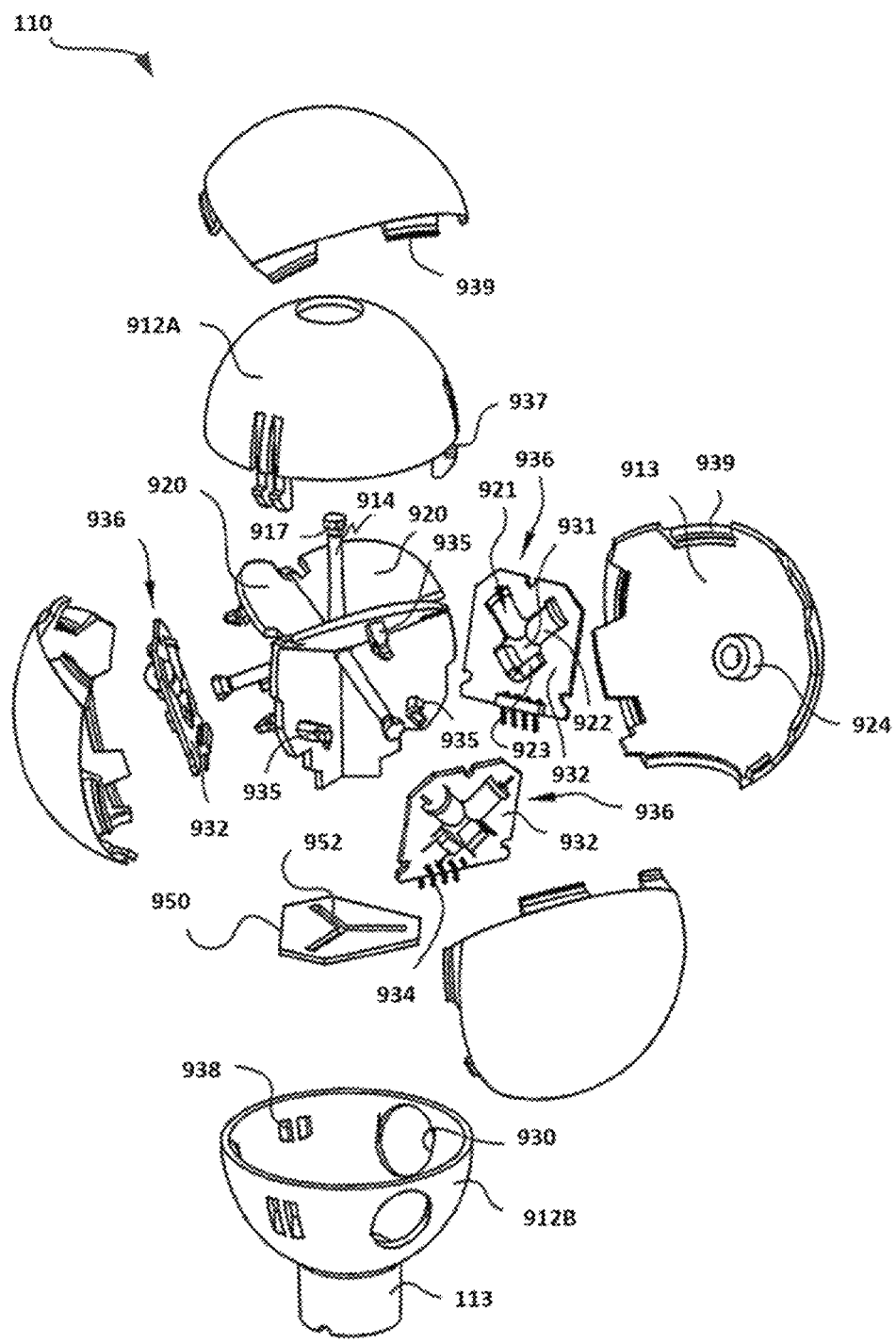
FIG. 13 is an exploded view of the first input controller of FIG. 9.
Figure 14:
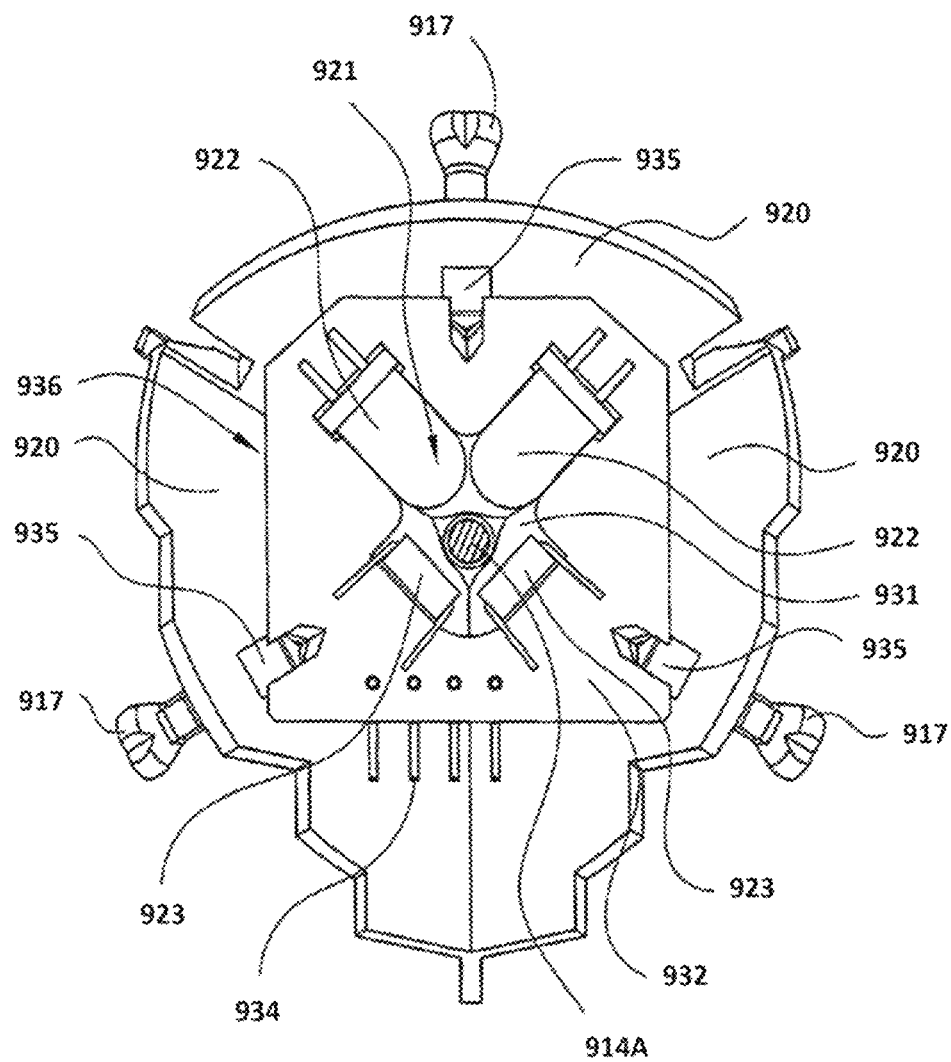
FIG. 14 is a schematic of the internal body of the input controller of FIG. 9.

The inner shell assembly 912 includes a plurality of interconnected shell portions 912A, 912B. In particular, the inner shell assembly 912 preferably includes a substantially spherical profiled wall which is formed from a first and second shell portions 912A. 912B which interconnect together to form the inner shell assembly 912. As shown in FIG. 13, the first shell portion 912A includes a plurality of resilient clipping arms 937 which are received and engaged within clipping apertures 938 in the wall of the second shell portion. The inner shell assembly 912 includes a plurality of arm holes 930. As shown in FIG. 13, the first (upper) shell portion 912A includes a first arm hole 930 and the second (lower) shell portion includes a second, third and fourth arm hole 930. A distal end of each arm 914 of the arm structure 910 extends through a respective one of the arm holes 930. One of the shell portions 912B includes a stem 113 defining a neck which can be to the housing 105 of the remote control device 100. The arm structure 910 is supported within the inner shell assembly 912 by one or more support structure 950 provided in the form of a support plate. Each support plate 950 include one or more slots 952 which receive a portion of a respective web of the arm structure 912. Each support plate 950 can be secured within the inner shell assembly 914.

The outer grippable body assembly 913 includes a plurality of interconnected segments 913. Each segment 913 includes a cavity 924 having a cylindrical profile on an inner surface of a wall of the segment 913 which releasably receives therein one of the tips 917 of one of the arms 914 that extends through one of the arm holes 930 of the inner shell 912. Each segment 913 includes tabs 939 that mechanically interconnect the segments together. The segments 932 can be secured together using an adhesive. Some of the segments 913 include a cutaway section to accommodate a portion of the stem 113 of the first input controller 110.

When the user grips the grippable body assembly 913 and applies a force in the x, y and/or z axes (as shown in FIGS. 18 and 19) and/or torque Rx, Ry and/or Rz about these axes, the grippable body assembly 913 moves relative to the inner shell assembly 912. The first input controller 110 includes a plurality of sensors 923, wherein each sensor 923 generates a signal indicative of flexing of a respective arm 914 due to the displacement between the grippable body 114 and the inner shell assembly 912. It will be appreciated that the x, y and z axes are orthogonal to each other.

In a preferable form, the plurality of sensors 923 are provided as a plurality of photodetectors 923. Each photodetector 923 has an associated light emitting diode (LED) 922 to form a photodetector and LED pair 921. The photodetector 923 detects light emitted from the respective LED 922 as a result of flexing of a respective arm 914 due to force and/or torque applied to the grippable body 114. In a preferable form, a double sensor pair 921 can be provided on a board 932 such as a circuit board which extends between neighbouring web surfaces 920. The circuit board 932 includes a hole 931 which the respective arm 914 passes therethrough. The photodetector 923 and LED 922 of each pair 921 are orthogonally arranged about the hole 931 (but in the same plane) which the arm 914 extends therethrough such that the arm 914 is located between the photodetector 923 and LED 922. The circuit board 932 can be secured to the web surfaces 920 by connecting elements 935 which engage notches in the mounting board 932. As force and/or torque are applied to the grippable body 114, one or more of the arms 914 deflect such that the amount of light received and sensed by at least some of the photodetectors 923 varies. Each circuit board 932 includes an electrical interface 934 which allows for an electrical communication medium such as a ribbon cable to run through the stem 113 and is in communication with the controller 400 of the remote control device 100.

The processor 410 of the controller 400 of the remote control device 100 can use the received signals from the plurality of sensors 936 to determine a two dimensional force vector through a plane normal to the receiving cavity 924 of the respective arm. The processor 410 of the controller 400 is configured to transform the two dimensional force vector acting through each arm tip 917 into a three dimensional force vector and a three dimensional torque vector acting through the centre of the first input controller 110. The three dimensional force vector and the three dimensional torque vector acting on the grippable body 114 is then calculated by the processor 410 by summing the four three dimensional force vectors and summing the four three dimensional torque vectors respectively.

The controller has stored in memory 420 conversion data which is used by the processor 410 to convert each photodetector signal to a two dimensional force vector. The force vector acting at the top of each arm is proportional to the signal generated by each respective photodetector 923.

It will be appreciated that for the arrangement shown in FIGS. 9 to 14 where the arm structure 912 includes four arms 914, four sensing arrangements 936 can be provided (i.e. two sensing pairs 921 per arm, each sensing pair including a photodetector and an LEDs). However, in particular arrangements, three sensing arrangements can be provided where a fourth two dimensional force vector can be calculated by the processor 410 of the controller 400. In particular, the processor 410 of the controller 400 uses the first, second and third two dimensional force vectors calculated using signals from the first second and third sensing pairs to the calculate a fourth two dimensional force vector for the arm 914 which does not include a sensing pair. The calculated fourth two dimensional vector can then be used by the processor 410 in the normal manner as previously described to determine the three dimensional force vector and the three dimensional torque vector applied to the grippable body 114.

In one variation, rather than the processor 410 of the controller 400 of the remote control device 100 calculating the three dimensional force vector and the three dimensional torque vector of force and torque applied to the grippable body, the first input controller can include a dedicated controller including a processor which performs these calculations. The dedicated controller is configured to perform the calculations mentioned above to generate data indicative of the three dimensional force vector and the three dimensional torque vector of force and torque applied to the grippable body. The memory of the dedicated controller can include a conversion data. The processor communicates, to the controller 400 of remote control device 100 and via to i/o interface of the dedicated controller, the data indicative of the three dimensional force vector and the three dimensional torque vector of force and torque applied to the grippable body.

Whilst examples have been discussed in relation to UAVs, it will be appreciated that the examples equally apply to other remotely controlled devices such as unmanned underwater vehicles (e.g. remotely controlled submarines).

Many modifications will be apparent to those skilled in the art without departing from the scope of the present invention.

The invention claimed is:

1. A remote control device for a remotely controlled device, the remote control device including:
   a housing;
   a first input controller, extending from the housing, including a grippable body which a user is able to apply a force thereto along three orthogonal axes and apply torque thereto about the three orthogonal axes with a first hand in order to be able to control a remotely controlled vehicle, wherein the first input controller detects force and torque applied to each of the three orthogonal axes, and generates one or more first input signals indicative of the force and the torque applied to the three orthogonal axes of the grippable body;
   a second input controller, extending from the housing, enabling a user to control, with a second hand, elevation of the remotely controlled device, wherein the second input controller generates one or more second input signals indicative of the elevation;
   a communication device; and
   a controller, located within the housing and electrically connected to the first input controller, the second input controller and the communication device, wherein the controller is configured to:
      receive the one or more first input signals and the one or more second input signals from the first input controller and the second input controller respectively; and
      control the communication device for transmitting:
         one or more output signals indicative of one or more commands based on the force and torque applied to the grippable body indicated by the one or more first input signals and the elevation indicated by the one or more second input signals.

2. The remote control device according to claim 1, wherein the grippable body has a substantially spherical body having a stem that extends from the housing in a first direction, and wherein the second input controller includes a joystick that extends from the housing in a second direction which is substantially orthogonal to the first direction.

3. The remote control device according to claim 2, wherein the remote control device includes at least one of:
an upper portion of the housing which has a recessed section locating the grippable body; and
an underside surface of the grippable body which is substantially aligned with the joystick in a returned position.

4. The remote control device according to claim 3, wherein an upper surface of the grippable body is substantially aligned with a top surface of the housing.

5. The remote control device according to claim 1, wherein the first input controller and second input controller are modular components which are releasably couplable to a portion of the housing and electrically couplable to the controller.

6. The remote control device according to claim 1, wherein the remote control device includes a detachable signal generating module for generating the one or more output signals, wherein the controller includes an interface for releasably coupling the signal generating module to the remote control device, wherein the controller is configured to:
transfer, via the interface and to the signal generating module, the one or more commands; and
receive, via the interface and from the signal generating module, the one or more output signals for transmission via the communication device.

7. The remote control device according to claim 6, wherein the controller is configured to transfer the one or more commands to the signal generating module via the interface in response to detecting the signal generating module being coupled to the interface.

8. The remote control device according to claim 1, wherein the controller has stored in memory a plurality of user defined nodes, wherein the plurality of user defined nodes are used in an interpolating function for interpolating an output value based on an input value indicated by the one or more first input signals or the one or more second input signals, wherein the output value is used by the controller to generate the one or more commands, wherein the nodes are not evenly spaced.

9. The remote control device according to claim 8, wherein the interpolating function is a Lagrange polynomial function, wherein the memory has stored therein a constant value for each user defined node, wherein each constant value is recalled from memory during interpolation of the output value.

10. The remote control device according to claim 8, wherein the controller receives, via the communication device, the plurality of user defined nodes from another device.

11. The remote control device according to claim 10, wherein the controller receives the plurality of user defined nodes from one of:
a transceiver device associated with the peripheral device; and
a processing system.

12. The remote control device according to claim 1, further comprising a system including:
a transceiver device associated with a remotely controlled device, wherein the transceiver includes:
a transceiver communication device;
a transceiver interface to communicate with a controller of the remotely controlled device;
a transceiver controller configured to:
transfer a request, via the interface to the controller of the remotely controlled device, for an identifier indicative of the remotely controlled device which the transceiver is associated therewith;
receive a response, via the interface from the controller of the remotely controlled device, indicative of the identifier; and
transfer a transceiver signal, via the communication device to a remote control device, indicative of the identifier; and
wherein a plurality of sets of user defined nodes for a plurality of remotely controlled devices, including the remotely controlled device, are stored in memory of the controller of the remote control device, wherein the controller is configured to select one of the sets of user defined nodes based on the identifier indicative of the remotely controlled device, wherein the selected set of user defined nodes are used in an interpolating function for interpolating an output value based on an input value indicated by the one or more first input signals to generate the one or more commands.

13. The system according to claim 12, wherein the request for the identifier indicative of the remotely controlled device is initiated in response to the transceiver receiving an initialisation signal from the remote control device.

14. The remote control device according to claim 1, further comprising a system including:
a transceiver device associated with a remotely controlled device, wherein the transceiver includes:
a transceiver communication device;
a transceiver interface to communicate with a controller of the remotely controlled device;
a transceiver controller including a memory having stored therein a plurality of sets of user defined nodes for a plurality of remotely controlled device including the remotely controlled device, wherein the transceiver controller is configured to:
transfer a request, via the interface to the controller of the remotely controlled device, for an identifier indicative of the remotely controlled device which the transceiver is associated therewith;
receive a response, via the interface from the controller of the remotely controlled device, indicative of the identifier;
select, based on the identifier, a set of user defined nodes for the remotely controlled device from the plurality of sets of user defined nodes; and
transfer a transceiver signal, via the communication device to a remote control device, indicative of the selected set of user defined nodes for the remotely controlled device; and wherein the controller is configured to:
receive, via the communication device, the transceiver signal;
store the selected set of user defined nodes indicated by the transceiver signal in memory; and
use the selected set of user defined nodes for generating the one or more commands.

15. The system according to claim 14, wherein the request for the identifier indicative of the remotely controlled device is initiated in response to the transceiver receiving an initialisation signal from the remote control device.

16. The remote control device according to claim 1, further comprising
a processing system in wired or wireless communication with the remote control device, wherein the processing system is configured to:
receive, via an input device of the processing system, a plurality of user defined nodes; and
transfer, to the remote control device, the user defined nodes, wherein the user defined nodes are used in an interpolating function to interpolate an output value based on one of the first and second input signals, wherein the interpolated output value is used to generate the one or more output commands.

17. The system according to claim 16, wherein the processing system is a mobile communication device executing a mobile communication device application.

18. The remote control device according to claim 1, wherein the first input controller further includes an inner shell assembly supporting an arm structure therein and one or more sensors configured to generate the one or more first input signals in response to flexing of the arm structure due to displacement between the grippable body and the inner shell assembly.

19. A remote control device for a remotely controlled device, the remote control device including:
a housing;
a first input controller, extending from the housing, including a grippable body which a user is able to apply a force thereto along three orthogonal axes and torque thereto about the three orthogonal axes with a first hand in order to be able to control a remotely controlled vehicle, wherein the first input controller detects force and torque applied to each of the three orthogonal axes, and generates one or more first input signals indicative of the force and the torque applied to the grippable body;
a second input controller, extending from the housing, enabling a user to control, with a second hand, a peripheral device associated with remotely controlled device, wherein the second input controller generates one or more second input signals;
a communication device; and
a controller, located within the housing and electrically connected to the first input controller, the second input controller and the communication device, wherein the controller is configured to:
receive the one or more first input signals and the one or more second input signals from the first input controller and the second input controller respectively; and
control the communication device for transmitting:
a first output signal indicative of a first command based on the force and torque applied to the grippable body indicated by the one or more first input signals; and
a second output signal indicative of a second command for controlling the peripheral device indicated by the one or more second input signals.

20. The remote control device according to claim 19, further comprising a system including:
a transceiver device associated with a remotely controlled device, wherein the transceiver includes:
a transceiver communication device;
a transceiver interface to communicate with a controller of the remotely controlled device;
a transceiver controller configured to:
transfer a request, via the interface to the controller of the remotely controlled device, for an identifier indicative of the remotely controlled device which the transceiver is associated therewith;
receive a response, via the interface from the controller of the remotely controlled device, indicative of the identifier; and
transfer a transceiver signal, via the communication device to a remote control device, indicative of the identifier; and
wherein a plurality of sets of user defined nodes for a plurality of remotely controlled devices, including the remotely controlled device, are stored in memory of the controller of the remote control device, wherein the controller of the remote control device is configured to select one of the sets of user defined nodes based on the identifier indicative of the remotely controlled device, wherein the selected set of user defined nodes are used in an interpolating function for interpolating an output value based on an input value indicated by the one or more first input signals to generate the one or more first commands.

21. The remote control device according to claim 19, including:
a transceiver device associated with a remotely controlled device, wherein the transceiver includes:
a transceiver communication device;
a transceiver interface to communicate with a controller of the remotely controlled device;
a transceiver controller including a memory having stored therein a plurality of sets of user defined nodes for a plurality of remotely controlled device including the remotely controlled device, wherein the transceiver controller is configured to:
transfer a request, via the interface to the controller of the remotely controlled device, for an identifier indicative of the remotely controlled device which the transceiver is associated therewith;
receive a response, via the interface from the controller of the remotely controlled device, indicative of the identifier;
select, based on the identifier, a set of user defined nodes for the remotely controlled device from the plurality of sets of user defined nodes; and
transfer a transceiver signal, via the communication device to a remote control device, indicative of the selected set of user defined nodes for the remotely controlled device; and
wherein the controller is configured to:
receive, via the communication device, the transceiver signal;
store the selected set of user defined nodes indicated by the transceiver signal in memory; and
use the selected set of user defined nodes and an input value indicated by the one or more first input signals in an interpolating function for interpolating an output value used for generating the one or more first commands.

22. The system of claim 21, wherein the first input controller further includes an inner shell assembly supporting an arm structure therein and one or more sensors configured to generate the one or more first input signals in response to flexing of the arm structure due to displacement between the grippable body and the inner shell assembly.

* * * * *